(12) United States Patent
Arai et al.

(10) Patent No.: US 9,013,303 B2
(45) Date of Patent: Apr. 21, 2015

(54) PRODUCT MANAGEMENT SYSTEM

(75) Inventors: Yasuyuki Arai, Atsugi (JP); Mai Akiba, Isehara (JP); Yuko Tachimura, Atsugi (JP); Yohei Kanno, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/555,519

(22) Filed: Jul. 23, 2012

(65) Prior Publication Data
US 2012/0299705 A1    Nov. 29, 2012

Related U.S. Application Data

(63) Continuation of application No. 10/594,308, filed as application No. PCT/JP2005/007113 on Apr. 6, 2005, now Pat. No. 8,237,569.

(30) Foreign Application Priority Data

Apr. 9, 2004   (JP) ................................. 2004-115225

(51) Int. Cl.
*G08B 1/08* (2006.01)
*H04B 5/00* (2006.01)
(Continued)

(52) U.S. Cl.
CPC .......... *H04B 5/0012* (2013.01); *G06K 7/10178* (2013.01); *G06K 17/00* (2013.01); *G06K 19/07758* (2013.01); *G06K 2017/0051* (2013.01); *H04B 5/0056* (2013.01); *H04B 5/0081* (2013.01)

(58) Field of Classification Search
USPC ....................................................... 340/572.7
See application file for complete search history.

(56) References Cited

U.S. PATENT DOCUMENTS 5,347,274 A    9/1994    Hassett
5,804,810 A    9/1998    Woolley et al.
(Continued)

FOREIGN PATENT DOCUMENTS

GB    2360422    9/2001
JP    11-066250 A    3/1999
(Continued)

OTHER PUBLICATIONS

"Sense of Crisis" Is a Trigger. Ignited Evolution of a Sesame-Grain Sized Chip Technology Development is Entering Into the Second Phase, Nikkei Electronics, Leading Trends, Nov. 18, 2002, No. 835, pp. 67-76.

(Continued)

*Primary Examiner* — Jack K Wang
(74) *Attorney, Agent, or Firm* — Eric J. Robinson; Robinson Intellectual Property Law Office, P.C.

(57) ABSTRACT

One feature of the present invention is a product management system that includes a package body for packing a product attached with an ID tag, and a reader/writer. The ID tag includes a thin film integrated circuit portion and an antenna, the package body includes a resonance circuit portion having an antenna coil and a capacitor, and the resonance circuit portion can communicate with the reader/writer and the ID tag. Accordingly, the stability of communication between an ID tag attached to a product and an R/W can be secured, and management of products can be conducted simply and efficiently, even if a product is packed by a package body.

23 Claims, 13 Drawing Sheets

(51) Int. Cl.
*G06K 7/10* (2006.01)
*G06K 17/00* (2006.01)
*G06K 19/077* (2006.01)
*H04Q 5/22* (2006.01)
*G08B 13/14* (2006.01)
*H01L 21/336* (2006.01)

(56) References Cited

U.S. PATENT DOCUMENTS

| | | | |
|---|---|---|---|
| 6,100,804 | A | 8/2000 | Brady et al. |
| 6,133,835 | A | 10/2000 | De Leeuw et al. |
| 6,168,829 | B1 | 1/2001 | Russ et al. |
| 6,509,217 | B1 | 1/2003 | Reddy |
| 6,542,114 | B1 | 4/2003 | Eagleson et al. |
| 6,563,425 | B2 | 5/2003 | Nicholson et al. |
| 7,126,552 | B2 | 10/2006 | Locatelli et al. |
| 2002/0021208 | A1 | 2/2002 | Nicholson et al. |
| 2002/0057208 | A1* | 5/2002 | Lin et al. ................ 340/825.49 |
| 2002/0094639 | A1 | 7/2002 | Reddy |
| 2003/0071731 | A1 | 4/2003 | Jesme |
| 2003/0085802 | A1* | 5/2003 | Kelly et al. ................ 340/10.1 |
| 2003/0116790 | A1 | 6/2003 | Kikuchi et al. |
| 2003/0122233 | A1 | 7/2003 | Yagi et al. |
| 2004/0021572 | A1* | 2/2004 | Schoen et al. ............ 340/572.1 |
| 2004/0082296 | A1 | 4/2004 | Twitchell |
| 2004/0145452 | A1* | 7/2004 | Fischer et al. ................ 340/10.1 |
| 2004/0164302 | A1 | 8/2004 | Arai et al. |
| 2004/0174260 | A1* | 9/2004 | Wagner ................ 340/568.1 |
| 2004/0217867 | A1 | 11/2004 | Bridgelall et al. |
| 2004/0245519 | A1 | 12/2004 | Van De Walle et al. |
| 2005/0001718 | A1 | 1/2005 | Asauchi |
| 2005/0128086 | A1 | 6/2005 | Brown et al. |
| 2007/0176773 | A1 | 8/2007 | Smolander et al. |

FOREIGN PATENT DOCUMENTS

| | | |
|---|---|---|
| JP | 2000-138621 A | 5/2000 |
| JP | 2001-030403 A | 2/2001 |
| JP | 2001-155134 A | 6/2001 |
| JP | 2003-016413 A | 1/2003 |
| JP | 2003-345818 A | 12/2003 |
| JP | 2003-346121 A | 12/2003 |
| JP | 2004-021484 A | 1/2004 |
| WO | WO-99/30432 | 6/1999 |

OTHER PUBLICATIONS

International Search Report (Application No. PCT/JP2005/007113) Dated Aug. 9, 2005.
Written Opinion (Application No. PCT/JP2005/007113) Dated Aug. 9, 2005.
Search Report (Application No. 05730700.1) Dated Oct. 31, 2008.
Office Action (Application No. 05730700.1) Dated Nov. 12, 2009.

* cited by examiner

FIG. 4
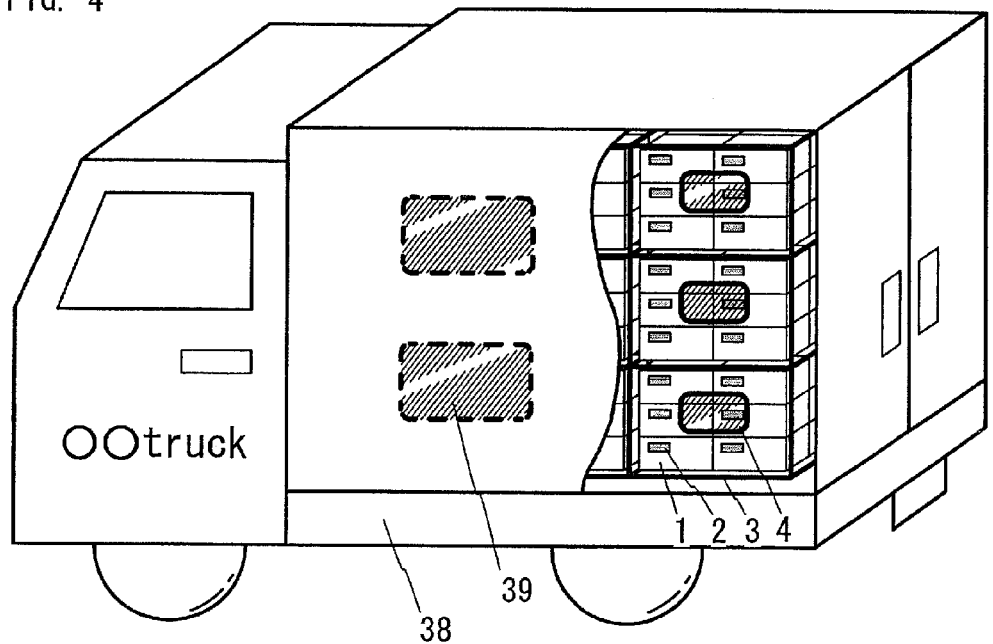
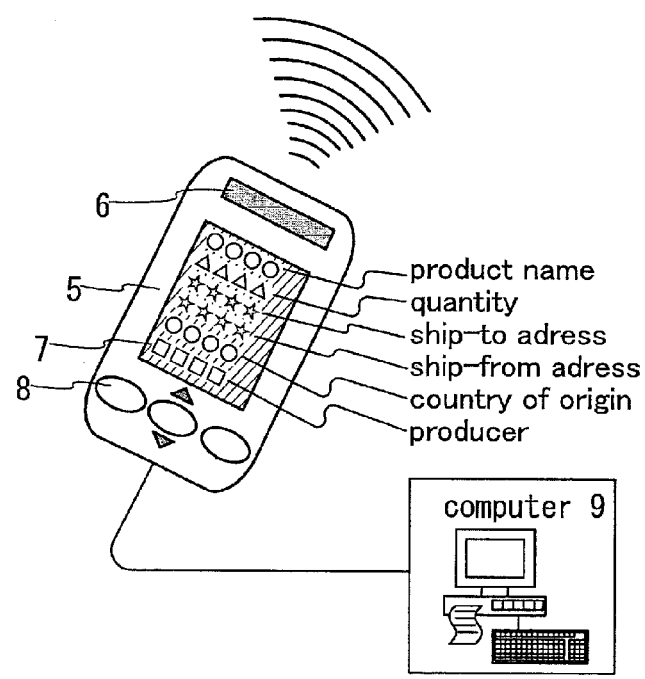

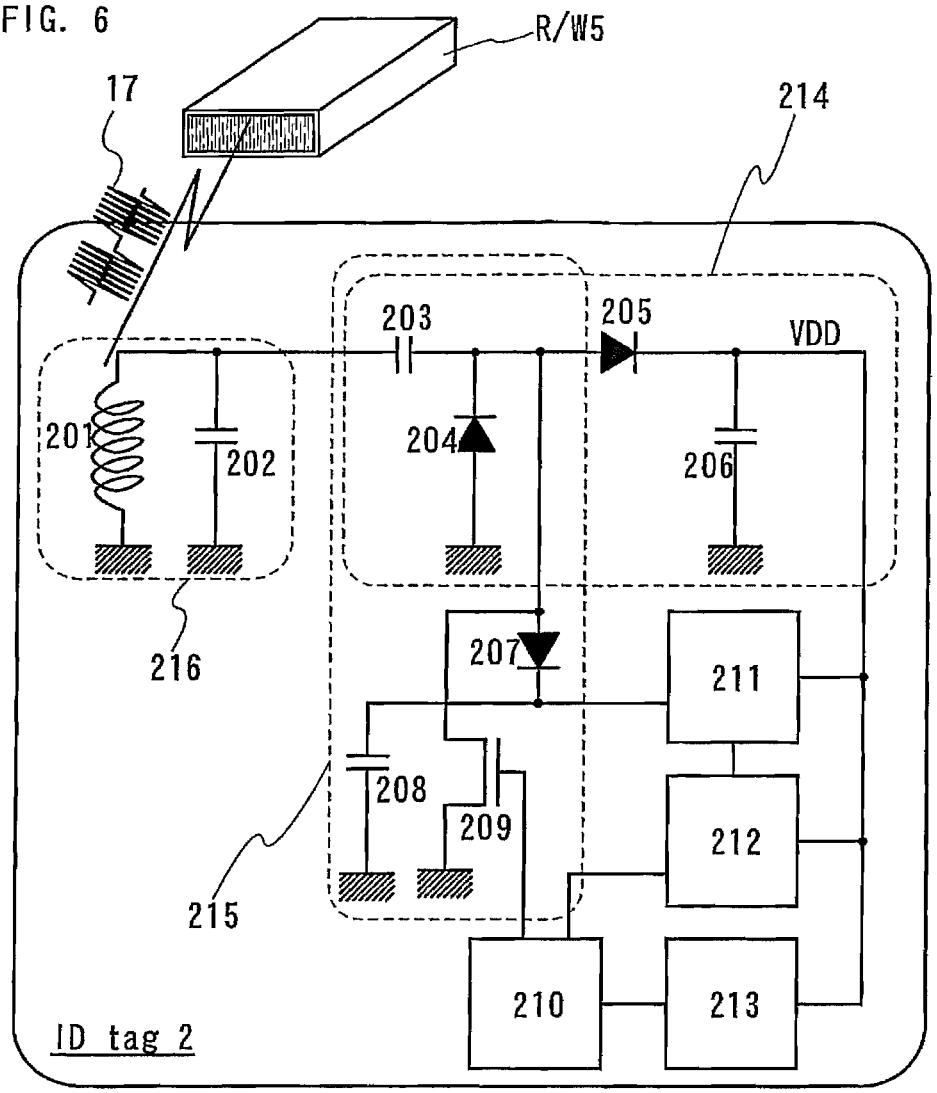

FIG. 7A forming separation layer and protective film
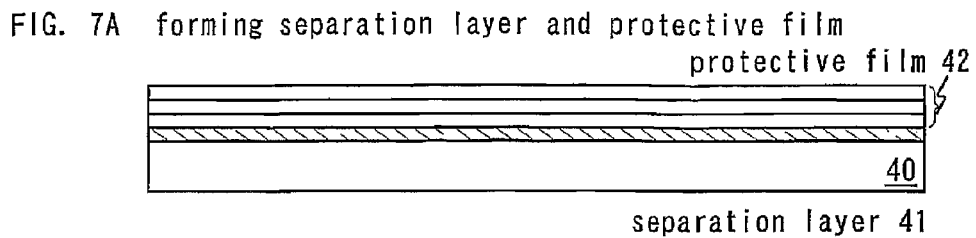
FIG. 7B forming semiconductor film and gate insulating film
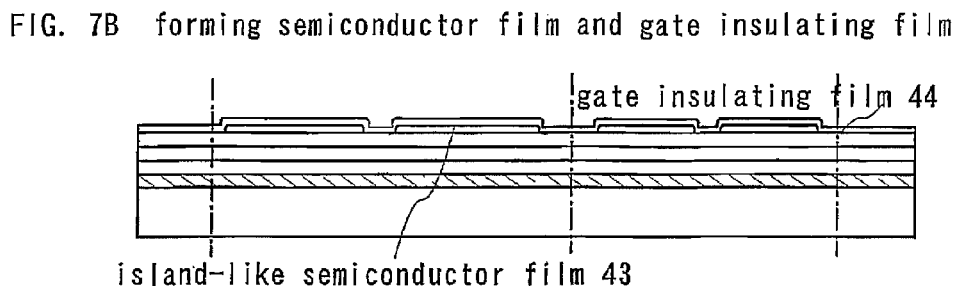
FIG. 7C forming gate electrode
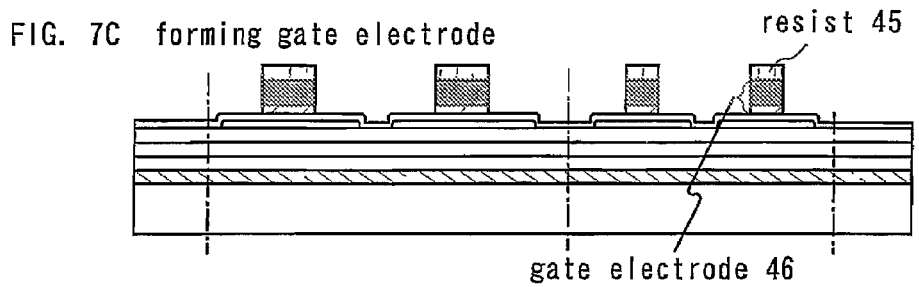
FIG. 7D forming n-type low concentration impurity region
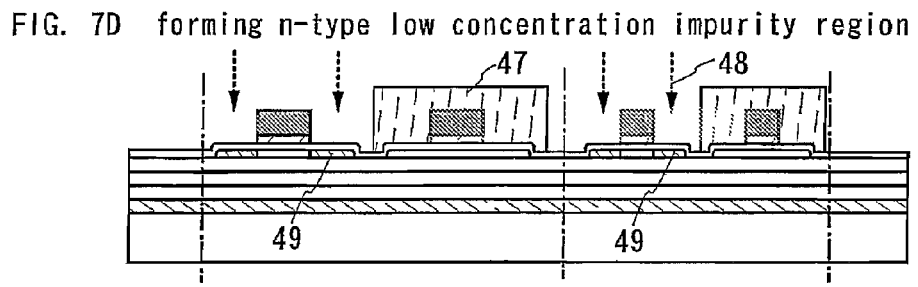
FIG. 7E forming p-type high concentration impurity region
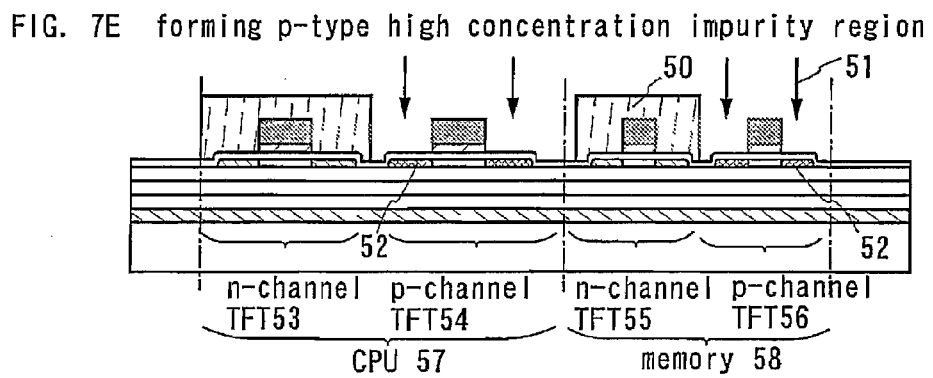

FIG. 8F forming insulatin film
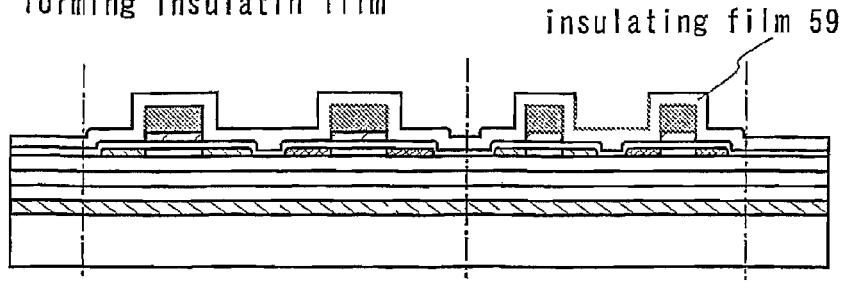
FIG. 8G etchback (forming sidewall)
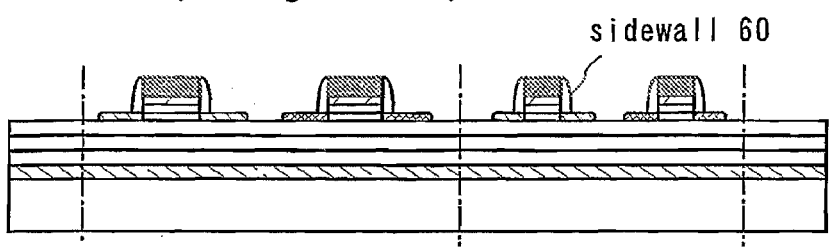
FIG. 8H forming n-type high concentration impurity region
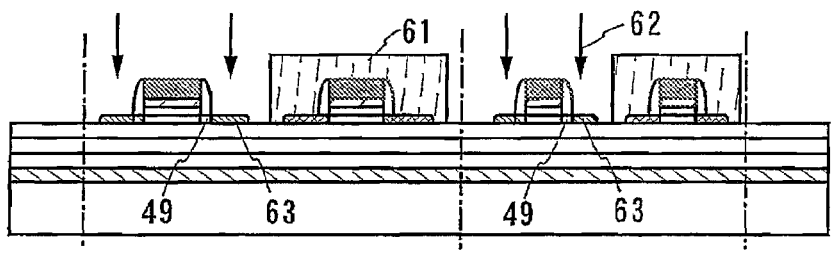
FIG. 8I forming interlayer, protective film and wiring
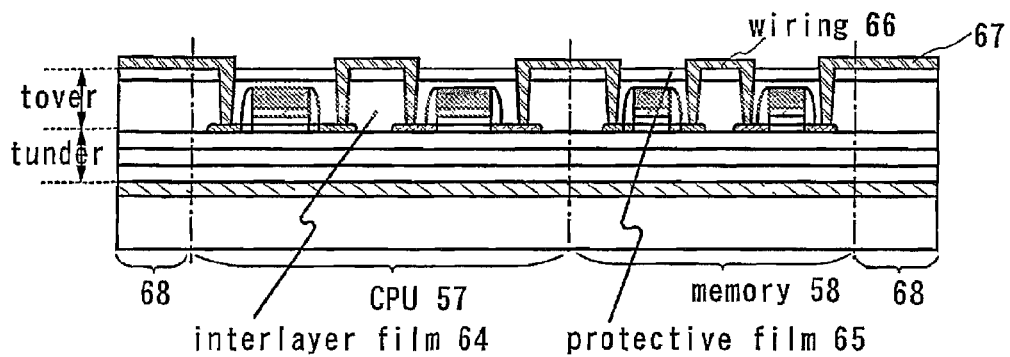

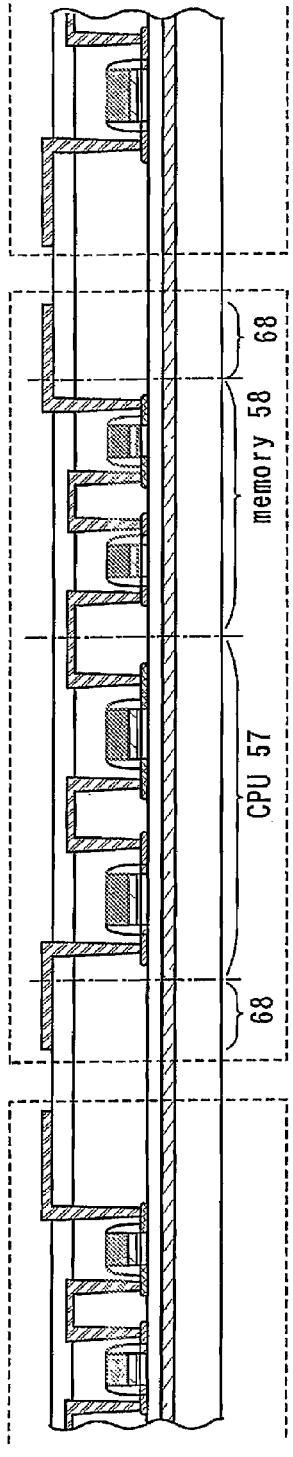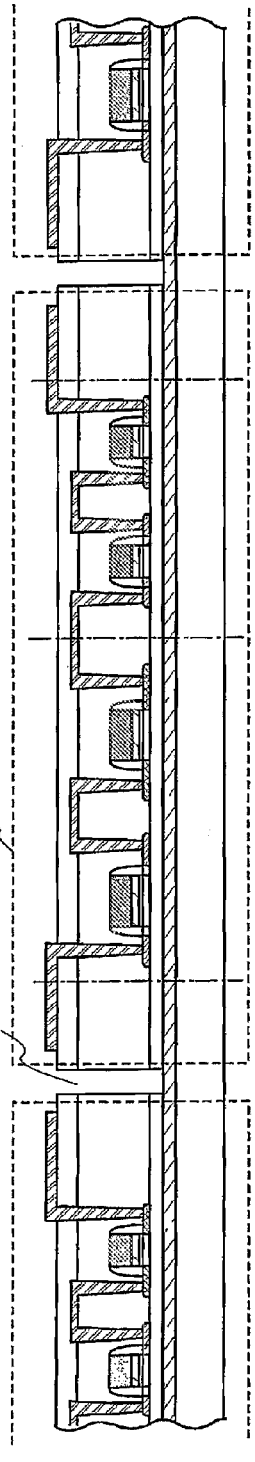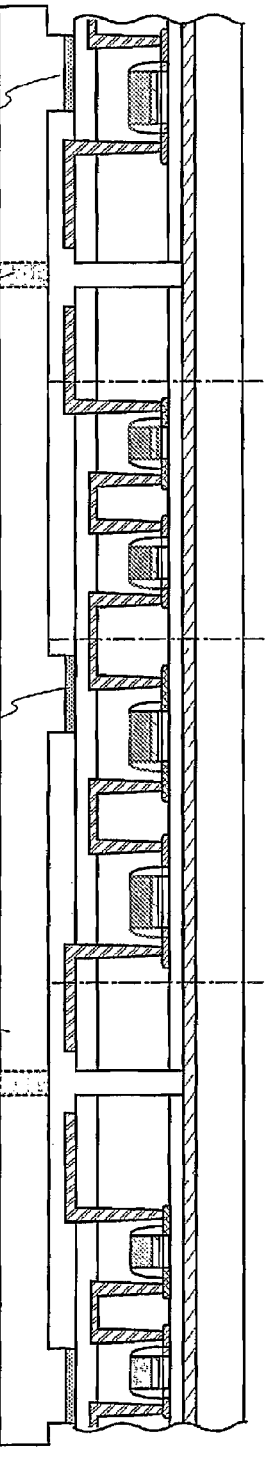

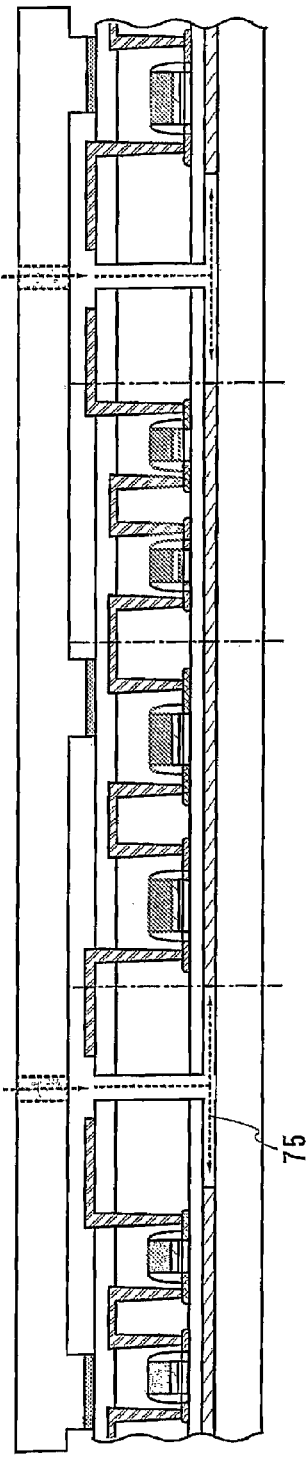
FIG. 10M introducing halogen fluoride
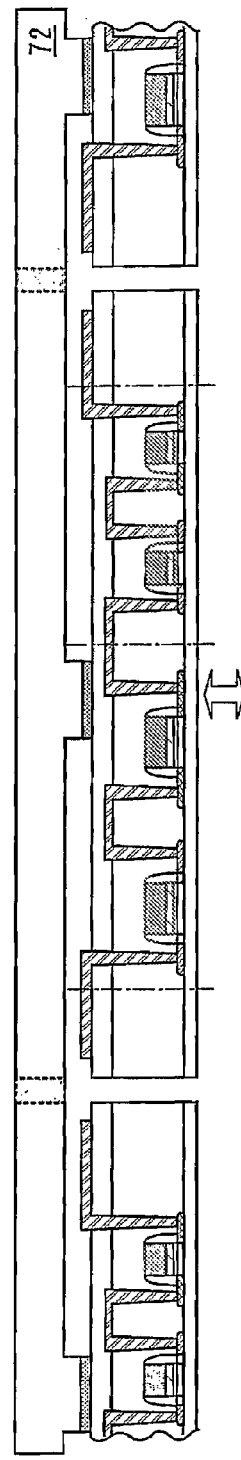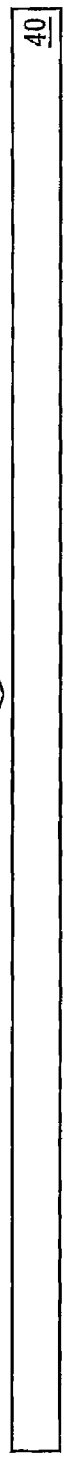
FIG. 10N separating substrate
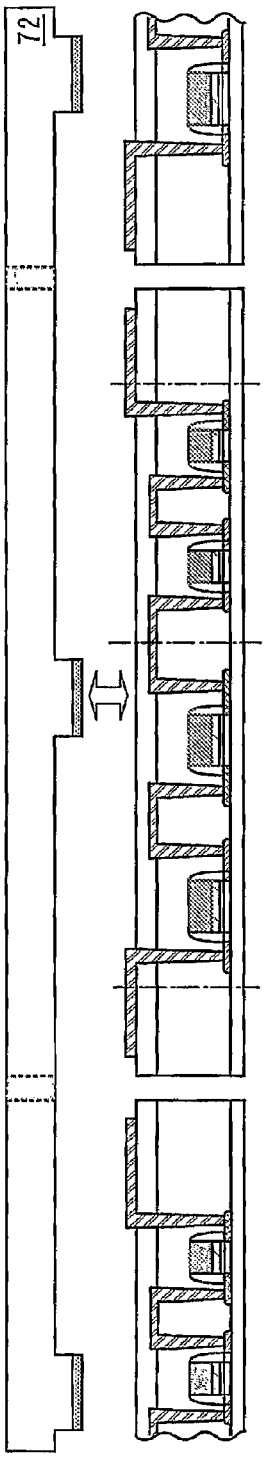
FIG. 10O detaching jig

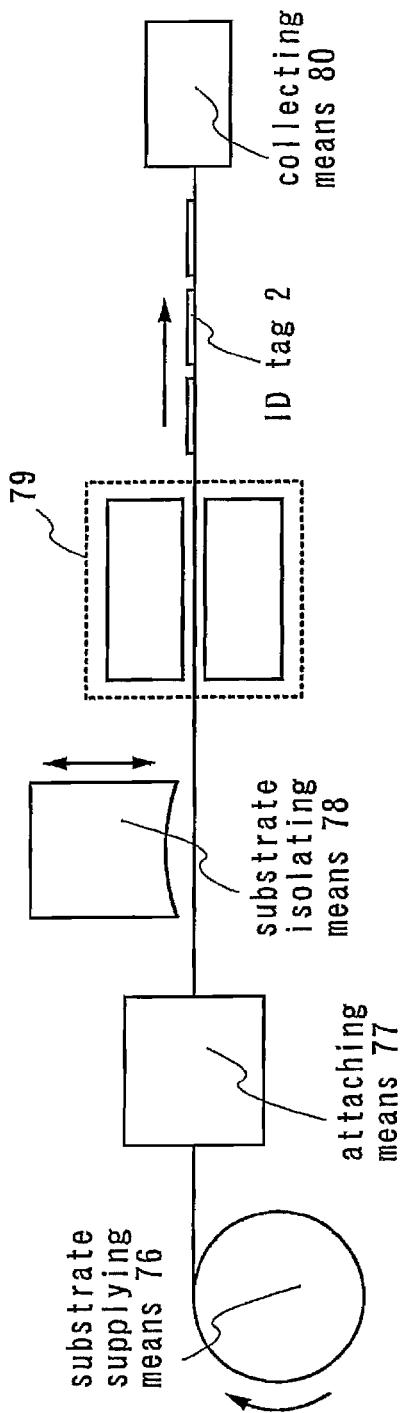
FIG. 11A
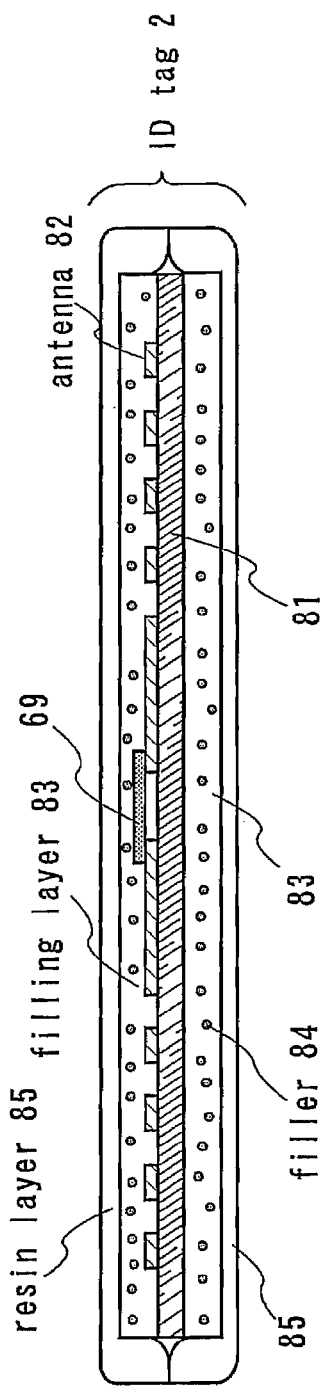
FIG. 11B  magnified drawing of IDtag as a completed article FIG. 13A  transfering and aligning substrate
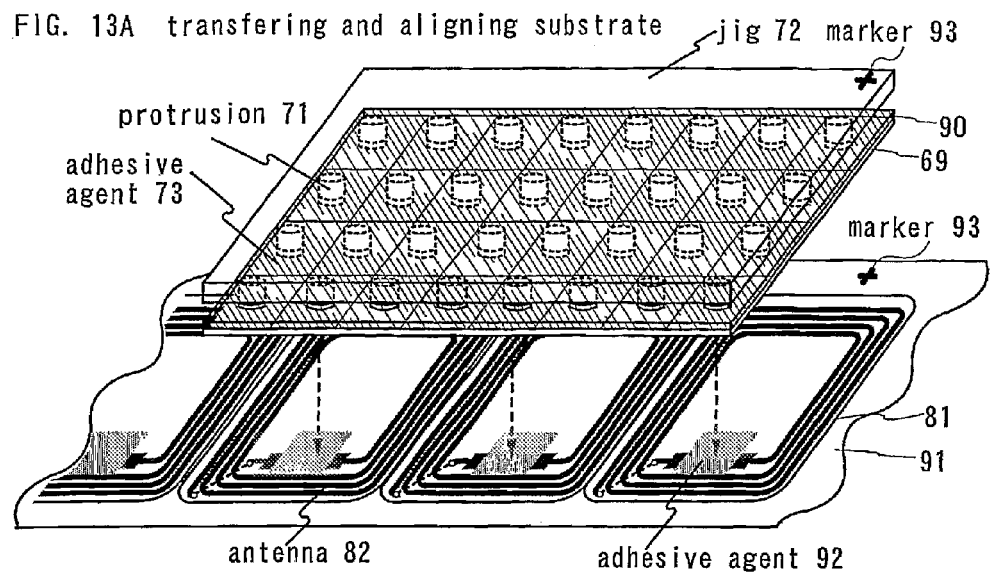
FIG. 13B  attaching thin film integrated circuit portion
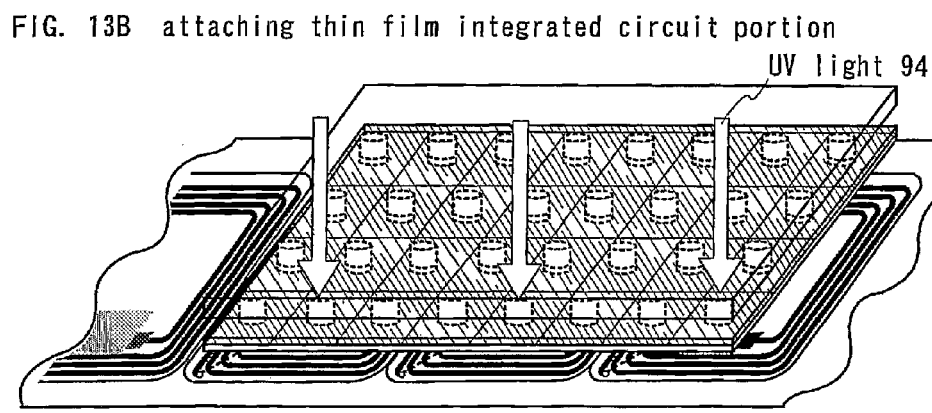
FIG. 13C  covering by coating
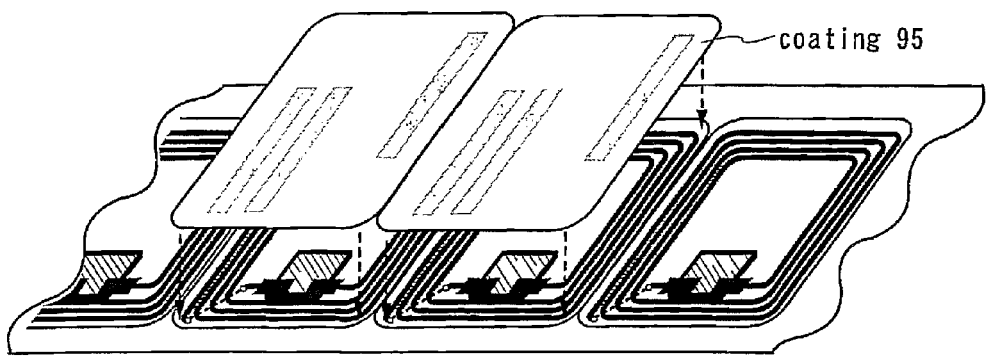

PRODUCT MANAGEMENT SYSTEM

TECHNICAL FIELD

The present invention relates to a product management system that reads and writes information about a product attached with an ID tag including a memory, a CPU and the like by a reader/writer.

BACKGROUND ART

Recently, in all kinds of industrial worlds such as food industry and manufacturing industry, demands for strengthening safety and management systems of products have been heightened, and therewith, the amount of information on the products are increasing. However, the current information on a product is just information such as a country of manufacture, a manufacturer, or an item number, mainly provided by ten and several figures of a barcode, and the amount of information is quite small. Further, in the case of using a barcode, scanning the barcodes by hand one by one requires long time. Consequently, instead of the barcode system, an automatic recognition technique by a non-contact IC tag utilizing an electromagnetic wave, which is called RFID (Radio Frequency Identification), has been attracting attention.

In addition, in order to ensure safety (for example, a place of origin, absence or presence of infectious disease, and the like) of animals and plants, a system is becoming common, in which IC chips are directly implanted into bodies of the animals and plants to obtain and manage information on the animals and plants by an information reading device (reader) outside the bodies (Reference 1: Nikkei Electronics (Nikkei Business Publications, Inc.) published on Nov. 18, 2002, pp. 67-76).

DISCLOSURE OF INVENTION

However, a product provided (attached) with an ID tag is usually placed in a package body such as a corrugated fiberboard or a container and transferred. At this time, when a product exists in a package body, there is a risk that communication with an ID tag using a reader/writer (also referred to as R/W) is blocked. In addition, when packing bodies containing products are stacked in a storehouse or the like, communication with an ID tag attached to each product may be blocked. Specifically, if communication range of an R/W is short, more internal products or products packed by a more internal package body is difficult to receive an electromagnetic wave emitted from the R/W.

Then, it is difficult to manage products in a distribution process of products, which leads to lose convenience of ID tags.

The present invention has been made in view of the above described problems. It is an object of the present invention to provide a product management system that can secure the stability of communication between an ID tag attached to a product and an R/W, and can conduct management of products simply and efficiently, even if a product is packed by a package body.

To solve the above described problems, according to the present invention, a product management system comprising a package body for packing a product attached with an ID tag, and a reader/writer for reading and writing information stored in the ID tag, wherein the ID tag includes a thin film integrated circuit portion including a thin film transistor, and an antenna; the packing body includes a resonance circuit portion including an antenna coil and a capacitor; and the resonance circuit portion can communicate with the reader/writer and the ID tag.

In other words, according to the present invention, a resonant circuit portion is provided to a package body for packing a product, and by using a resonance between the resonant circuit portion and an R/W for reading and writing information stored in the ID tag, communication between an ID tag and the R/W is conducted certainly and smoothly. The resonant circuit portion includes at least an inductance L and a capacitance C that are served by an antenna coil and a capacitor, respectively.

A product management system according to the present invention has a structure described above. Thus, information stored in an ID tag can be surely read and erased, and information can be surely written, overwritten and so on in the ID tag, by conducting reception/transmission of a signal between an R/W and the ID tag through a resonant circuit portion. Specifically, communication disabled or communication instability due to directivity (a property of going in only a certain direction or a property of receiving from only a certain direction) between an R/W and an ID tag attached to a product can be solved and communication between them can be conducted surely. Therefore, the present invention is effective when reading or writing information in an ID tag 2 attached to a product 1 once in a short time.

An ID tag used in the present invention includes at least a thin film integrated circuit portion including a thin film transistor, and an antenna, and thus can be manufactured at a lower cost than an ID tag formed by a conventional method by which a plurality of integrated circuits are formed over a silicon wafer and the silicon wafer is ground and removed to isolate the thin film integrated circuits. In other words, the thin film integrated circuits can be separated from a substrate on which the plurality of thin film integrated circuits are formed to isolate elements. ID tags can be manufactured at a lower cost since a glass substrate or the like that is less expensive than a silicon wafer can be used as a separation substrate (a substrate from which element are separated) which the separation substrate can also be used multiple times.

Further, in forming a resonant circuit portion, a plurality of thin film integrated circuit portions mainly having a thin film structure is formed over a substrate, and the resonant circuit portion is formed by the separation method, thereby manufacturing the resonant circuit portion at a low cost.

Note that a chemical separation method using a gas or a liquid of halide such as $ClF_3$, and a physical separation method by which a substrate provided with a plurality of thin film integrated circuit portions is stressed to separate the substrate are cited as the separation method. Any of them may be employed. However, element-separation can be conducted more surely by the chemical separation method than the physical separation method.

As described above, communication between an R/W and an ID tag can be conducted more securely through a resonant circuit portion using an ID tag manufactured at low cost. Therefore, product management system with higher performance can be provided.

BRIEF DESCRIPTION OF DRAWINGS

In the accompanying drawings.

FIG. 4 shows a transportation vehicle provided with a resonant circuit portion;

FIG. 6 is a block diagram showing an example of a circuit configuration of an ID tag;

FIGS. 7A to 7E each show manufacturing steps of an ID tag according to one aspect of the present invention;

FIGS. 8F to 8I each show manufacturing steps of an ID tag according to one aspect of the present invention;

FIGS. 9J to 9L each show manufacturing steps of an ID tag according to one aspect of the present invention;

FIGS. 10M to 10O each show manufacturing steps of an ID tag according to one aspect of the present invention;

FIGS. 11A and 11B each show manufacturing steps of an ID tag according to one aspect of the present invention;

FIGS. 13A to 13C each show manufacturing steps (a transferring method to an inlet substrate) of an ID tag according to one aspect of the present invention.

BEST MODE FOR CARRYING OUT THE INVENTION

Embodiment Modes according to the present invention will hereinafter be described with reference to the accompanying drawings. The present invention can be carried out in many different modes, and it is easily understood by those skilled in the art that modes and details herein disclosed can be modified in various ways without departing from the spirit and the scope of the present invention. It should be noted that the present invention should not be interpreted as being limited to the description of the embodiment modes to be given below.

Embodiment Mode 1

A structure of a product management system according to the present invention is described with reference to FIG. 1.

Figure 1:
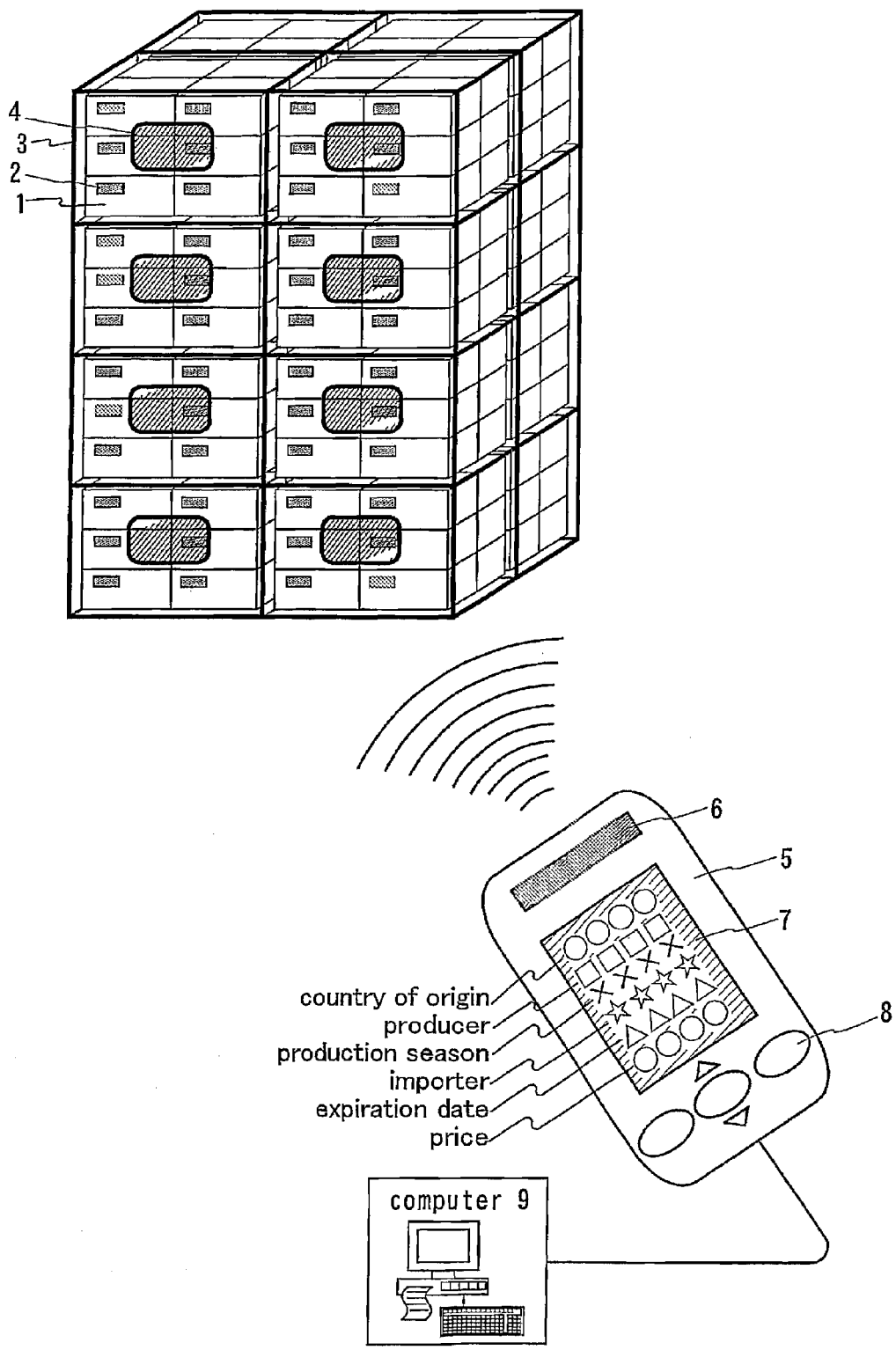
FIG. 1 is a schematic diagram of a product management system according to one aspect of the present invention.

In FIG. 1, a plurality of packing bodies 3 in which products 1 are packed are stacked. An ID tag 2 storing various information about the product 1 is attached to the product 1. A resonant circuit portion 4 is formed in the package body 3. The products 1 may be of the same types or different types.

Herein, an ID tag (Identification tag) attached to a product has mainly a function of identifying products distributed in a market or a function of storing information on the products, and is referred to as an ID chip, an ID label, an ID seal, an ID sticker and the like depending on a mode thereof. ID tags include a card-like ID tag An ID tag in the present invention includes a thin film integrated circuit portion. The thin film integrated circuit portion is conceptually different from a conventional IC (Integrated Circuit) which is formed on a silicon wafer. The thin film integrated circuit portion denotes an integrated circuit portion that at least includes a thin film active element typified by a TFT (thin film transistor), a wiring for connecting the thin film active elements, a wiring for connecting the thin film active elements with an external mechanism (such as an antenna of a non-contact ID tag) and the like. Of course, constituent elements of the thin film integrated circuit portion are not limited thereto, and the thin film integrated circuit portion may include at least one thin film active element typified by a TFT.

Note that a thin film integrated circuit portion constituting a part of an ID tag according to the present invention is thinner than that in a conventional IC chip. Thus, the thin film integrated circuit portion is also called an IDT chip (Identification Thin Chip) or the like. In addition, the thin film integrated circuit portion to be used in the present invention uses an insulating substrate such as a glass substrate or a quartz substrate in principle without using a silicon wafer and can be transferred to a flexible substrate, as described later. Therefore, the thin film integrated circuit portion is also referred to as an IDG chip (Identification Glass Chip), an IDF chip (Identification Flexible Chip), a soft chip, or the like. A chip with an antenna mounted is also called as a radio frequency chip.

The ID tag 2 is attached to the outer surface of the product 1 to be confirmed visibly in FIG. 1. However, the ID tag 2 may be provided in the inside of the product 1. Note that a product herein includes a casing thereof as well as the content of the product itself.

Figure 2:
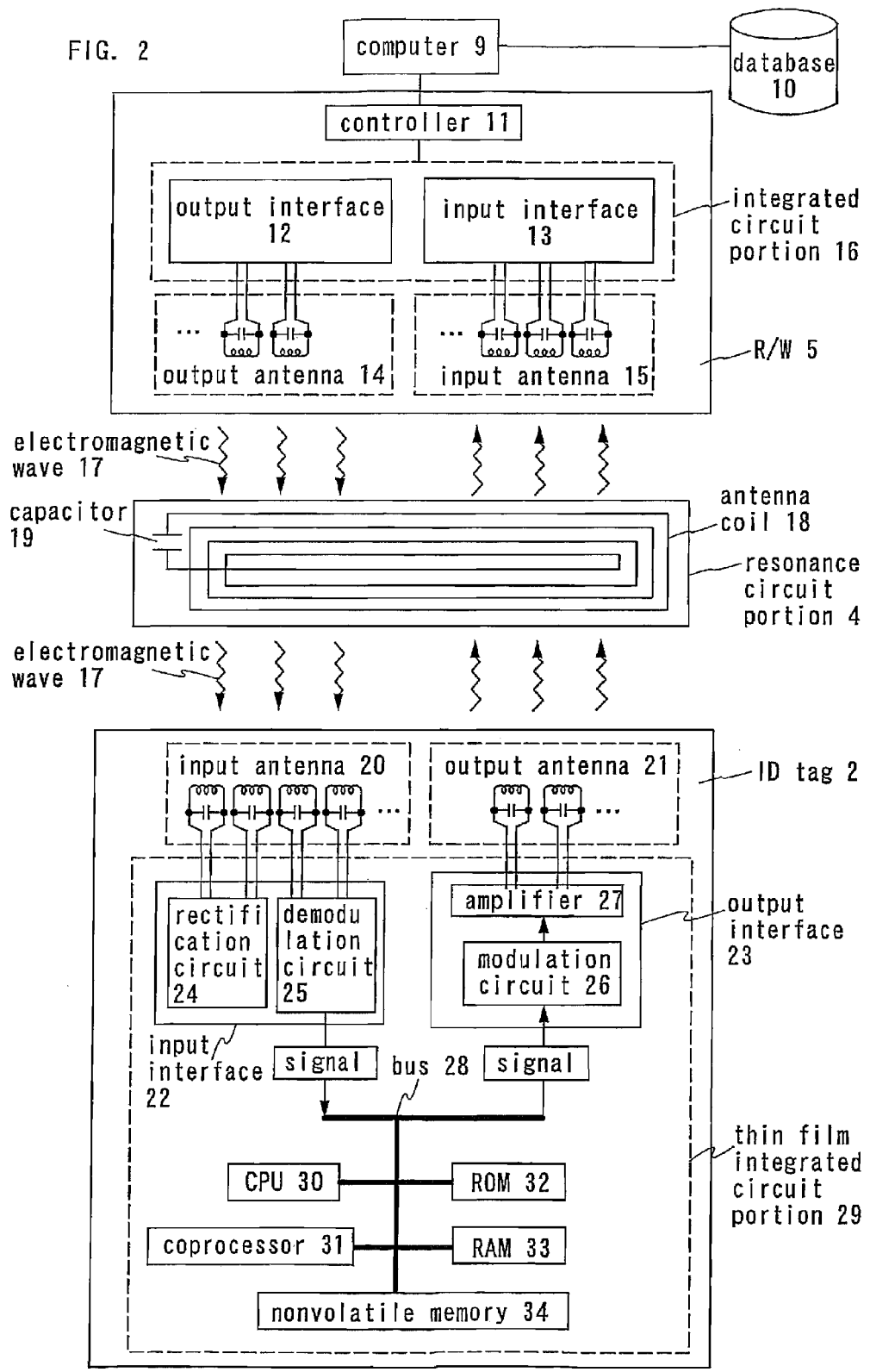
FIG. 2 is a block diagram showing an example of a circuit configuration of a product management system according to one aspect of the present invention.

A resonant circuit portion 4 includes at least an antenna coil 18 serving as an inductance and a capacitor 19 as shown in FIG. 2. The resonant circuit portion 4 receives an electromagnetic wave from a reader/writer (R/W) 5 for reading and writing various information on the product 1, which is stored in the ID tag 2, and transmits the electromagnetic wave to the ID tag 2. Further, the resonant circuit portion 4 receives an electromagnetic wave from the ID tag 2 and transmits the electromagnetic wave to the R/W 5. As described above, the resonant circuit portion 4 serves as a relay point of transmission/reception between the R/W 5 and the ID tag 2.

The resonant circuit portion 4 is designed to resonate with almost the same frequency as that of an electromagnetic wave transmitted from the R/W 5. In other words, the values of inductance L of an antenna coil 18 and capacitance C of a capacitor 19 (ref. FIG. 2) which constitute resonant circuit portion 4 are adjusted to resonate with the R/W 5.

Resonance herein means that an object oscillates when added from the outside with the same frequency as a frequency by which an oscillator oscillates most easily (natural frequency), even if the frequency is a little force. This natural frequency is called a resonance frequency and is unique for each oscillator. Resonance frequency f is expressed with $f = 1/\{2\pi(LC)^{1/2}\}$. In other words, the values of inductance L of the antenna coil 18 and capacitance C of the capacitor 19 that constitute the resonant circuit portion 4 are adjusted and the frequency f is adjusted to be almost the same frequency as that of the R/W 5, thereby resonating the resonant circuit portion 4.

When the R/W 5 is brought closer to the package body 3 containing the product 1, an electromagnetic wave is emitted from an antenna portion 6 to the package body 3. The resonant circuit portion 4 formed in the package body 3 can receive an alternating electromagnetic wave efficiently from the R/W 5, since the resonant circuit portion 4 resonates with almost the same frequency as that of the R/W 5. Further, the resonant circuit portion 4 conducts power supply to the ID tag 2 and transmission/reception of a signal between the ID tag 2 and the resonant circuit portion 4 (in other words, transmission/reception of a signal between the ID tag and the R/W 5) by an electromagnetic coupling method, an electromagnetic induction method, an electrostatic coupling method or the like.

Thus, information stored in the ID tag 2 can be securely read and erased, and information can be securely written, overwritten and so on in the ID tag, by conducting reception/transmission of a signal between the R/W 5 and the ID tag 2 through the resonant circuit portion 4. Specifically, communication disabled or communication instability due to directivity (a property of going in only a certain direction or a property of receiving from only a certain direction) between the R/W 5 and the ID tag 2 attached to the product 1 can be solved and communication between them can be conducted surely.

Note that an electromagnetic induction method, an electromagnetic coupling method, a microwave method, an optical communication method, an electrostatic coupling method and the like can be employed for the communication method between the R/W 5 and the resonant circuit portion 4 and the communication method between the resonant circuit portion 4 and the ID tag 2. The communication methods for the both may be identical or different.

In general, an electromagnetic induction method, an electromagnetic coupling method, and an electrostatic coupling method are classified into a vicinity type, a close type and a proximity type depending on the communication range; however, any of them may be used.

The communication range between the reader/writer and the resonant circuit portion may be longer than the communication range between the resonant circuit portion and the ID tag. It becomes possible to communicate with the ID tag from a distance and conduct remote control by extending the communication range between the resonant circuit portion and the reader/writer.

Information stored in the ID tag 2, which has been received by the antenna portion 6, is displayed on a display portion 7 provided inside the R/W 5. For example, information of the product 1, such as a country of origin, a producer, a production season, an importer, an expiration date, and a price, are displayed. Operation keys 8 are provided in the R/W 5 and thereby, ON/OFF of the communication with the ID tag 2 and selection, deletion and the like of information that has been read become possible. The R/W 5 is connected to a computer 9. The computer 9 controls the R/W 5 and processes information read by the R/W 5.

Note that the resonant circuit portion 4 may include a battery, a CPU, a memory and the like for its own. Thus, information can be stored in the resonant circuit portion 4 temporarily. Further, the resonant circuit portion 4 may function as an R/W. Thus, for example, in packing the product 1, information accumulated in the resonant circuit portion 4 can be written in the ID tag 2, and the information accumulated in the ID tag 2 can be read out.

The package body 3 can be reused after the product 1 is taken out from the package body 3.

Embodiment Mode 2

A product management system according to the present invention is described more in detail with reference to FIG. 2. FIG. 2 is a block diagram showing configurations of an ID tag 2, a resonant circuit portion 4 and an R/W 5.

The R/W 5 includes at least an output interface 12, an input interface 13, an output antenna 14 and an input antenna 15. Note that the number of each antenna is not limited to that shown in FIG. 2. Moreover, the shape of antenna is not limited to a coil-like shape.

A signal modulated in the output interface 12 of the R/W 5 is output from the output antenna 14 and sent to the ID tag 2 through the resonant circuit portion 4 provided in a package body 3.

The resonant circuit portion 4 includes at least a circuit provided with an impedance Z that is inductive and capacitive. The inductive impedance is an inductance L and the capacitive impedance is a capacitance C. For example, as shown in FIG. 2, the resonant circuit portion 4 includes at least an antenna coil 18 serving as the inductance L and a capacitor 19 serving as the capacitance C. The inductance L and the capacitance C may be serially connected to each other (series resonance), or may be connected in parallel (parallel resonance).

In the resonant circuit portion 4, for example, in the case where the coil (inductance L) and the capacitor (capacitance C) are serially connected to each other, impedance becomes zero at a resonance point, $(f \approx 1/\{2\pi(LC)^{1/2}\})$, since reactance of the coil and the capacitor (an imaginary part of the impedance) is offset at the resonance point. Note that impedance is equal to resistance R of the wiring since resistance R (a real part of impedance) inevitably generates in the actual element. The material of a wiring constituting a part of the resonant circuit portion 4 preferably employs a material having low wiring resistance.

For example, it is desirable to employ low electric specific resistance such as Cu ($1.55 \times 10^{-6}$ $\Omega \cdot$cm), Al ($2.65 \times 10^{-6}$ $\Omega \cdot$cm), Au ($2.2 \times 10^{-6}$ $\Omega \cdot$cm), Ag ($1.62 \times 10^{-6}$ $\Omega$/cm) and the like. These may be plated or stacked.

On the other hand, the ID tag 2 includes at least an input antenna 20, an output antenna 21, an input interface 22, an output interface 23, and various circuits such as a CPU 30, a coprocessor 31, a ROM 32, a RAM 33 and a nonvolatile memory 34, and a bus 28 for connecting them. Note that the number of each antenna is not limited to that shown in FIG. 2. Moreover, the shape of each antenna is not limited to a coil-like shape.

The input interface 22 is provided at least with a rectification circuit 24 and a demodulation circuit 25. An alternating source voltage input from the input antenna 20 is rectified to a direct-current source voltage in the rectification circuit 24 and is supplied to the above various circuits through the bus 28. The alternating current of various signals input from the input antenna 20 is demodulated in the demodulation circuit 25. Various signals whose waveform is shaped by being demodulated are supplied to the above various circuits through the bus 28.

The coprocessor 31 serves as a sub-processor that works to aid the CPU 30 as a main processor when all processes are controlled in a thin film integrated circuit portion 29. Generally, the coprocessor functions as an instruction execution unit exclusively for processing of codes, and can execute processing of codes, which is necessary for applications such as settlements. As the nonvolatile memory 34, for example, an EPROM, an EEPROM, a UV-EPROM, a flash memory, or an FRAM (registered trademark) in which information can be rewritten more than once is preferably used.

The memory used in the ID tag 2 is divided, based on its function and behavior, into a program memory (a region in which a program is stored), a working memory (a region in which data is temporarily saved in the process of executing a program), and a data memory (a region in which fixed data treated by a program is stored in addition to information unique to a product). Generally, a ROM is used as the program memory, and a RAM is used as the working memory. In addition, the RAM also functions as a buffer during communication with the R/W. In order to store data input as signals in a predetermined address, an EEPROM is generally used.

Various signals demodulated in the demodulation circuit 25 are supplied to the various circuits and then information unique to a product, which has been stored in the memory, is replaced by a signal in the various circuits. Further, the signal is modulated in the output interface 23 and transmitted to the R/W 5 through the resonant circuit portion 4 by the output antenna 21.

The output interface 23 includes at least a modulation circuit 26 and an amplifier 27. Various signals input into the output interface 23 from the various circuits are modulated in the modulation circuit 26 and amplified or buffer-amplified in the amplifier 27 and then transmitted to a terminal device such as the R/W 5 from the output antenna 21. An input antenna 15 of the R/W 5 receives a signal transmitted from the ID tag 2. The signal is demodulated in the input interface 13 and transmitted to a computer 9 through a controller 11, and is subjected to data processing, thereby recognizing the information unique to the product.

Further, read information can be accumulated in a database 10 connected to the computer 9. On the contrary, information accumulated in the database 10 can be written in the ID tag 2 through the R/W 5.

Although the computer 9 has software that has a function of processing information on a product, of course, hardware may be used for information processing. Consequently, as compared with work of reading barcodes one-by-one in a conventional way, time and labor for information processing and errors are reduced to reduce burden for management of products.

The various circuits shown in FIG. 2 are just one mode of configurations according to the present invention. The various circuits mounted on the ID tag 2 or R/W 5 are not limited to the above-mentioned circuits. FIG. 2 shows an example using antennas for the non-contact type. However, the non-contact type is not limited to this example. A light-emitting element, a light sensor, or the like may be used to transmit and receive data with light.

In FIG. 2, the input interface 22 and the output interface 23, which include analog circuits such as the rectification circuit 24, the demodulation circuit 25, and the modulation circuit 26; the CPU 30; the various memories; and the like are formed as one thin film integrated circuit portion 29. However, the configuration is just one example, and the present invention is not limited to this configuration. The generic term "thin film integrated circuit portion 29" means that a thin film active element typified by a TFT is included in each component part; however, all component parts are not necessarily formed by TFTs and at least one component part may be formed by a TFT or the like. For example, the input interface 22 and the output interface 23, which include analog circuits such as the rectification circuit 24, the demodulation circuit 25, and the modulation circuit 26 can be formed on a silicon wafer as a conventional manner, while the CPU 30, the various memories, and the like can be formed with a thin film integrated circuit formed by using TFTs.

As described above, if a thin film integrated circuit part including a thin film active element such as a TFT is used for at least one of component parts of the ID tag 2, back-grinding is not needed, unlike a conventional IC chip formed on a silicon wafer. Advantageous effects that process can be simplified drastically and manufacturing cost can be reduced drastically and so on can be obtained. Further, if a physical or a chemical separation method is employed in forming a thin film integrated circuit portion, a glass substrate, a quartz substrate, a solar battery grade silicon substrate and the like can be used as a separation substrate. Further, the separation substrate can be reused to reduce the manufacturing cost drastically.

Note that the input antenna 20 and the output antenna 21 may be formed to be included in the thin film integrated circuit portion 29. In addition, one antenna may serve as the both input one and output one, without differentiating the input antenna 20 and the output antenna 21.

FIG. 2 shows an example of supplying a source voltage from the R/W 5 that is a terminal device, but the present invention is not limited to this. For example, a solar battery may be provided in the ID tag 2 although not shown. In addition, an ultra thin battery such as a lithium battery may be built-in.

Note that the thin film integrated circuit portion 16 of the R/W 5 (including at least the output interface 12 and the input interface 13) may use an IC formed on a silicon wafer in a conventional manner. However, a thin film integrated circuit portion made from a thin film active element (thin film non-linear element) like a thin film transistor (TFT) can be used, similarly to the thin film integrated circuit portion 29 of the ID tag 2 in the case of forming a small and thin R/W 5.

When a thin film integrated circuit is used as a component part of the R/W 5, the above working-effect can be obtained similarly to the case of using the thin film integrated circuit portion 29 in the ID tag 2.

Note that the output antenna 14 and the input antenna 15 may be formed to be included in the thin film integrated circuit portion 16. In addition, one antenna may serve as the both input one and output one, without differentiating the input antenna 14 and the output antenna 15.

Embodiment 1

Figure 3:
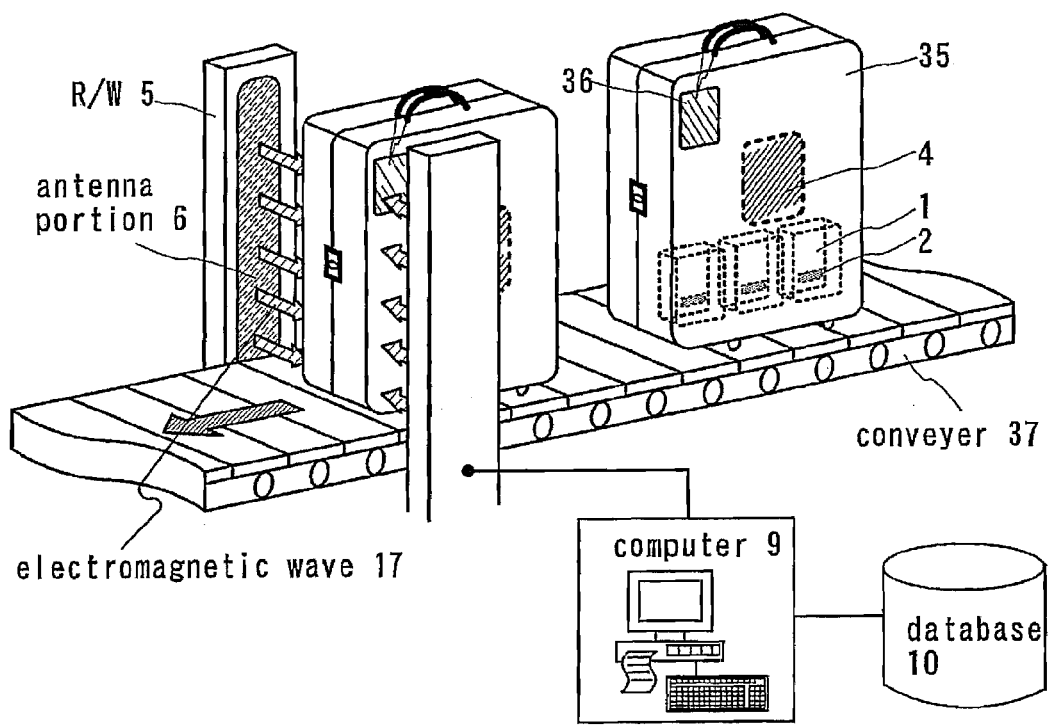
FIG. 3 shows a baggage management system in an airport or the like, to which the present invention is applied.

An example of applying the present invention is described with reference to FIG. 3 in Embodiment 1. Baggage inspection in the airport or the like is shown in FIG. 3. Here, a suitcase 35 of a tourist or the like serves as a package body. The suitcase 35 includes at least one resonant circuit portion 4. The resonant circuit portion 4 may be provided for an outer surface of the suitcase 35; however, is preferably formed inside or an interior portion of a cover for preventing separation due to external force, theft and the like. Inside the suitcase 35, a product 1 and the like are packed. ID tags 2 are attached to each product.

Baggage such as the suitcase 35 containing the product 1 is transferred by a conveyor 37. When the baggage reaches an antenna portion 6 of the R/W 5, the resonant circuit portion 4 provided for the suitcase 35 receives an electromagnetic wave from the R/W 5 and transmits the electromagnetic wave to the ID tag 2. As described above, the resonant circuit portion 4 serves as a relay point of transmission/reception between the R/W 5 and the ID tag 2.

The resonant circuit portion 4 includes at least an antenna coil 18 serving as an inductance and a capacitor 19 as shown in FIG. 2. The resonant circuit portion 4 is designed to resonate with almost the same frequency as that of an electromagnetic wave sent from the R/W 5. In other words, the values of inductance L of the antenna coil 18 and capacitance C of the capacitor 19 constituting the resonant circuit portion 4 are adjusted to resonate with the R/W 5.

The resonant circuit portion 4 formed in the suitcase 35 can receive an alternating electromagnetic wave efficiently from the R/W 5 since the resonant circuit portion resonates with almost the same frequency as that of the R/W 5. Further, the resonant circuit portion 4 conducts power supply to the ID tag 2 and transmission/reception of a signal between the ID tag 2 and the resonant circuit portion 4 (in other words, transmission/reception of a signal between the ID tag 2 and the R/W 5) by an electromagnetic coupling method, an electromagnetic induction method, an electrostatic coupling method or the like.

Thus, information stored in the ID tag 2 can be surely read and erased, and information can be surely written, overwritten and so on in the ID tag, by conducting reception/transmission of a signal between the R/W 5 and the ID tag 2 through the resonant circuit portion 4. In an inspection system of products contained in the baggage according to the present invention, the resonant circuit portion 4 is provided for the package body such as a suitcase 35 containing the product 1. Thus, communication disabled or communication instability due to directivity (a property of going in only a certain direction or a property of receiving from only a certain direction) between the R/W 5 and the ID tag 2 attached to a product 1 can be solved and communication between them can be conducted surely.

Note that information that is received by the antenna portion 6 and stored in the ID tag 2 is processed by the computer 9 connected to the R/W 5. In addition, when a tag 36 attached to the baggage such as the suitcase 35 is an ID tag, information stored in the ID tag 2 attached to the product 1 is written and read by the R/W 5, and simultaneously information stored in the tag 36 can be written and read by the R/W 5.

A display screen may be provided for the R/W 5 or the computer 9 as necessary, and read information on the product 1 or information of the tag 36 may be displayed appropriately thereon. For example, all pieces of information of the product such as a product name, a country of origin, weight, price or information stored in the tag 36 such as a departure place, a route, a destination are displayed.

Further, a database 10 may be connected to the computer 9. The information on the product 1 read by the R/W 5 and the information on the product stored in the database may be cross-checked, and thus it can be determined instantly whether the product 1 contained in the suitcase 35 is an appropriate product (a product that is not a forged product, a dangerous material or the like). In addition, retention of a forged product or the like that is not stored in the database can be recognized, if the total weight of the baggage is not equal to the total weight of the products that is read by the R/W 5 (or weight obtained by inquiry with the database). In this manner, forged products can be interdicted at the border, and smuggling of forged products and terrorism can be prevented beforehand.

Embodiment 2

Embodiment 2 describes another example of applying the present invention with reference to FIG. 4. In FIG. 4, a product 1 contained in a package body 3 is loaded in a transportation vehicle 38 such as an autotruck. An ID tag 2 is attached to a product 1 and a resonant circuit portion 4 (hereinafter, referred to as a first resonant circuit portion in this embodiment) is formed in the package body 3. Further, another resonant circuit portion 39 (hereinafter, referred to as a second resonant circuit portion in this embodiment) that is at least one and is different from the resonant circuit portion 4 is provided in a door portion or a frame portion of the transportation vehicle 38. The first resonant circuit portion may be provided for an outer surface of the package body 3; however, is preferably formed inside or an interior portion of a cover for preventing separation due to external force, theft and the like. The second resonant circuit portion may be provided for an outer surface of a door portion or a frame portion of the transportation vehicle 38; however, is preferably formed inside or an interior portion of a cover for preventing separation due to external force, theft and the like.

When information on the product 1 stored in the ID tag 2 from the outside of the transportation vehicle 38 is read and written with an R/W 5, an electromagnetic wave transmitted from an antenna portion 6 of the R/W 5 is received by the second resonant circuit portion and transmitted to the first resonant circuit portion. The electromagnetic wave transmitted to the first resonant circuit portion is further transmitted to the ID tag 2. In some cases, an electromagnetic wave is directly to the ID tag 2 from the second resonant circuit portion, if the ID tag 2 exists in the periphery of the second resonant circuit portion. Also, an electromagnetic wave from the R/W 5 is directly received by the first resonant circuit portion or the ID tag 2 in some cases. However, by providing the second resonant circuit portion, communication disabled or communication instability due to directivity (a property of going in only a certain direction or a property of receiving from only a certain direction) between the R/W 5 and the ID tag 2 attached to the product 1 can be solved and thus, the communication between them can be conducted surely.

The first and second resonant circuit portions each include at least an antenna coil serving as inductance and a capacitor similarly to that shown in FIG. 2. And each resonant circuit portion is designed to resonate with almost the same frequency as that of an electromagnetic wave transmitted from the R/W 5. In other words, the values of inductance L of the antenna coil and capacitance C of the capacitor constituting each resonant circuit portion are adjusted to resonate with the R/W 5.

The first and second resonant circuit portions can receive an alternating electromagnetic wave efficiently from the R/W 5 since these resonant circuit portions resonate with almost the same frequency as that of the R/W 5. Further, power supply to the ID tag 2 is performed and transmission/reception of a signal between the ID tag 2 and the R/W 5 is partially or wholly conducted, by adopting an electromagnetic coupling method, an electromagnetic induction method, an electrostatic coupling method or the like between the first and second resonant circuit portions, between the ID tag and the first resonant circuit portion, and between the ID tag and the second resonant circuit portion. Note that communication between the R/W 5 and the ID tag can be conducted even when the transportation vehicle 38 stops or runs.

As described above, when the product 1 is covered with a plurality of barriers (here, the package body 3 and the transportation vehicle 38), a signal is received and transmitted between the ID tag 2 and the R/W 5 through the resonant circuit portion provided for each barrier, and thus it can be conducted securely to read and erase information stored in the ID tag 2, and to write, or overwrite information to the ID tag 2.

Note that information which is received by the antenna portion 6 and then stored in the ID tag 2 is processed by the computer 9 connected to the R/W 5. A display screen 7 may be provided for the R/W 5 as necessary, and read information on the product 1 may be displayed appropriately. For example, all pieces of information of the product 1 such as a product name, quantity, a ship-to address, a ship-from address, a country of origin, a producer, a production season are displayed. The display screen may be provided for the computer 9. Operation keys 8 are provided for the R/W 5, and ON/OFF of communication with the ID tag 2 can be controlled, and also selection, deletion and the like of the read information can be conducted.

Further, a database 10 may be connected to the computer 9. The information on the product 1 read by the R/W 5 and the information on the product stored in the database can be cross-checked.

Embodiment 3

Figure 5A:
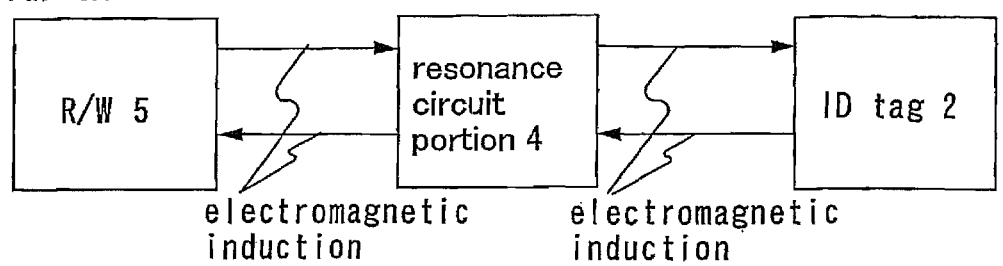
FIGS. 5A to 5C each show various communication methods.
Figure 5B:
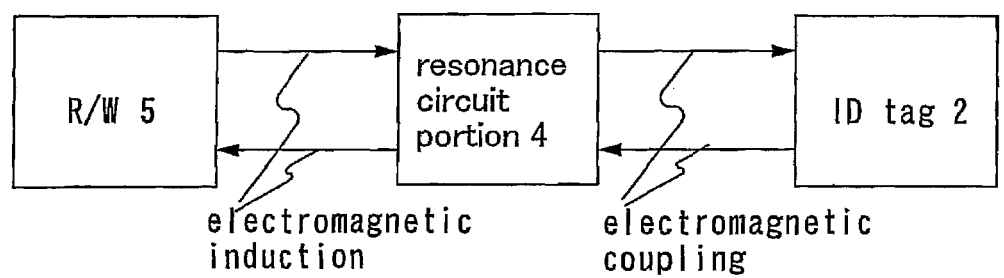
Figure 5C:
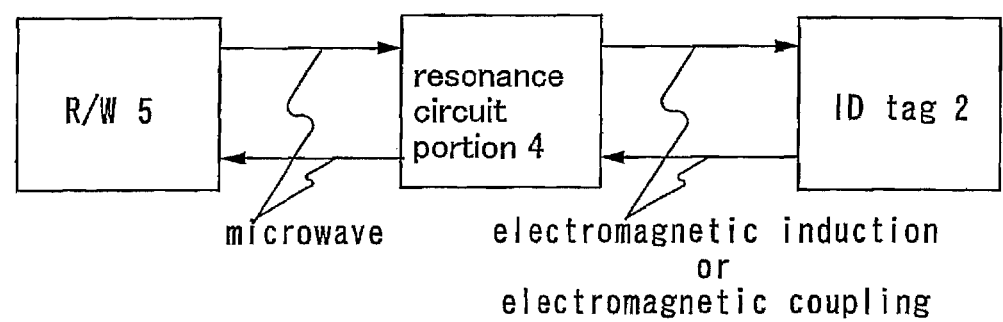

Embodiment 3 describes an example of communication methods according to the present invention with reference to FIGS. 5A to 5C.

As the communication methods according to the present invention, there are cases where communication method between an R/W 5 and a resonant circuit portion 4 is identical to that between an ID tag 2 and the resonant circuit portion 4, and where communication method between the R/W 5 and the resonant circuit portion 4 is different from that between the ID tag 2 and the resonant circuit portion 4. In the case of using an identical communication method, as shown in FIG. 5A, an electromagnetic induction method (in general, the communication range of about 1 m or less) can be adopted in the both methods as an example. In the case of using the electromagnetic induction method, frequency to be used may be adopted widely from less than 135 KHz, more than 13.56 MHz and the range from 135 KHz to 13.56 MHz. Typically, 4.9 MHz, 13.56 MHz, 900 MHz bands are employed.

In addition, in the case of using an identical communication method, even if the resonant circuit portion 4 does not function for any reason, communication can be conducted by direct reception/transmission of an electromagnetic wave between the R/W 5 and the ID tag 2.

In the case of employing the different communication method, shown in FIG. 5B, for example, an electromagnetic induction method is used for communication between the R/W 5 and the resonant circuit portion 4, and an electromagnetic coupling method can be used for communication between the resonant circuit portion 4 and the ID tag 2. The electromagnetic coupling method has a shorter communication range than the electromagnetic induction method (in general, the communication range of several tens mm or less). In the case of the electromagnetic coupling method, almost the same frequency can be adopted as that of the electromagnetic induction method.

As shown in FIG. 5C, the communication between the R/W 5 and the resonant circuit portion 4 adopts a microwave method (in general, the communication range of about 3 m or less) and the communication between the resonant circuit portion 4 and the ID tag 2 can adopt the electromagnetic induction method or the electromagnetic coupling method that has a shorter communication range than the microwave method. In the case of microwave method, frequency to be used is generally 2.45 GHz band.

Specifically, as the communication method between the R/W 5 and the resonant circuit portion 4, the electromagnetic induction method or a microwave method is employed, and the communication range between the R/W 5 and the resonant circuit portion 4 is made larger than that between the resonant circuit portion 4 and the ID tag 2, thereby the R/W 5 in the distance can communicate with the ID tag 2.

Note that when the communication method is changed before and after an electromagnetic wave passes through the resonant circuit portion 4, circuit elements such as the antenna coil and the capacitor, and arrangement thereof in the resonant circuit portion 4 may be changed depending on the communication method.

Of course, the combination of the communication methods is not limited to these in the present invention. Further, an electrostatic coupling method or an optical communication system may be combined.

As shown in Embodiment 2, if resonance circuit portions are provided doubly or triply, the above described communication methods can be combined appropriately. Note that the resonant circuit portions are preferably designed so that the range between the R/W 5 and the resonance circuit portions can be as long as possible.

Embodiment 4

Embodiment 4 describes specifically an example of an ID tag 2 configuration according to the present invention with reference to FIG. 6. FIG. 6 shows a schematic diagram of the ID tag 2 which includes a power supply circuit 214, an input-output circuit 215, an antenna circuit 216, a logic circuit 210, an amplifier 211, a clock generation circuit-decoder 212, a memory 213, and the like. The antenna circuit 216 has an antenna wiring 201 and an antenna capacitor 202.

The ID tag operates without its own power supply since electric power is supplied by receiving an electromagnetic wave 17 emitted from an R/W 5. When the antenna circuit 216 receives the electromagnetic wave 17 from the R/W 5, a signal as a detected output signal is detected by the input-output circuit 215 including a first capacitor means 203, a first diode 204, a third diode 207, a third capacitor means 208, and the like. This signal is amplified by the amplifier 211 to have a sufficient large amplitude, and then, divided into a clock and data-instruction by the clock generation circuit-decoder 212. The transmitted instruction is decoded by the logic circuit 210 to make a reply of data in the memory 213 and write necessary information in the memory, for example.

The reply is made by ON/OFF of a switching element 209 in accordance with the output of the logic circuit 210. This changes the impedance of the antenna circuit 216, which results in a change in reflectivity of the antenna circuit 216. The R/W 5 reads information from the ID tag by monitoring the change in reflectivity of the antenna circuit 216.

The electric power to be consumed by the respective circuits in the ID tag 2 is supplied from a direct-current power source VDD generated by detecting and smoothing the electromagnetic wave 17 received by the power supply circuit 214. The power supply circuit 214 has the first capacitor means 203, the first diode 204, a second diode 205, and a second capacitor means 206, similarly to the input-output circuit 215, and the second capacitor means 206 is controlled to have a sufficiently large value in order to supply electric power to the respective circuits.

Embodiment 5

In Embodiment 5 a specific manufacturing method of an ID tag 2 will be described with reference to FIGS. 7A to 10O. For simplification, the manufacturing method will be described here by showing cross-sectional structures of a CPU and memory using an n-channel TFT and a p-channel TFT.

A plurality of TFTs, a protective film, various wirings and an antenna (an element or a circuit including at least these elements referred to as a thin film integrated circuit portion, hereinafter) are formed over a substrate 40.

First, a separation layer 41 is formed on a substrate 40 (FIG. 7A). An a-Si film (amorphous silicon film) with a film thickness of 50 nm (500 Å) is formed on a glass substrate (for example, a Corning 1737 substrate) by a sputtering method here. As the substrate, in addition to a glass substrate, substrates such as a quartz substrate, a substrate including an insulating material such as alumina, a silicon wafer substrate, a thermal silicon oxide substrate, a SIMOX substrate and a heat-resistant plastic substrate that can withstand processing temperatures in subsequent processes, can be used.

As the separation layer, in addition to amorphous silicon, a layer including silicon as its main component, such as polycrystalline silicon, single-crystal silicon, or SAS (semi-amorphous silicon (also referred to as micro-crystalline silicon)), can be used. These separation layers may be formed by a method such as CVD instead of a sputtering method. It is preferable that the film thickness of the separation layer is made to be 50 to 54 nm (500 to 540 Å). As for SAS, the film thickness may be 30 to 50 nm (300 to 500 Å).

Next, a protective film 42 (also referred to as a base film or a base insulating film) is formed over the separation layer 41 (FIG. 7A). Although a three-layered structure of a SiON film with a film thickness of 100 nm, a SiNO film with a film thickness of 50 nm, and a SiON film with a film thickness of 100 nm is employed here, the materials, the film thicknesses, or the number of laminations are not limited to this. For example, instead of the lower SiON film, a heat-resistant resin such as siloxane with a film thickness of 0.5 to 3 μm may be formed by a method such as spin coating, slit coater, or droplet discharging. Alternatively, a silicon nitride film (for example, SiN or $Si_3N_4$) may be used. It is preferable that each film thickness is made to be 0.05 to 3 μm, which can be freely selected within the range.

The silicon oxide film can be formed by a method such as thermal CVD, plasma CVD, atmospheric CVD, or bias ECRCVD with the use of a mixed gas such as a $SiH_4$—$O_2$ mixed gas or a TEOS (tetraethoxysilane)-$O_2$ mixed gas. The silicon nitride film can be formed typically by a plasma CVD method with the use of a $SiH_4$—$NH_3$ mixed gas. The SiON film or SiNO film can be formed typically by a plasma CVD method with the use of a $SiH_4$—$N_2O$ mixed gas.

In the case where a material including silicon such as a-Si as a main component is used as the separation layer 41 and an island-like semiconductor film 43 to be formed later, as the protective film 42 in contact with those, SiOxNy may be used from the viewpoint of ensuring adhesion.

Next, thin film transistors (TFTs) constituting a part of a CPU and a memory of a thin film integrated circuit portion are formed over the protective film 42. In addition to the TFTs, thin film active elements such as organic TFTs and thin film diodes can also be formed.

In a method for manufacturing the TFTs, island-like semiconductor films 43 are formed first on the protective film 42 (FIG. 7B). The island-like semiconductor films 43 are formed by using an amorphous semiconductor, a crystalline semiconductor, or semi-amorphous semiconductor. In any case, it is possible to use a semiconductor film including a material such as silicon or silicon-germanium (SiGe) as its main component.

In this embodiment, amorphous silicon with a film thickness of 70 nm is formed, and a treatment with a solution including nickel is further given to the surface of the amorphous silicon. Further, a crystalline silicon semiconductor film is obtained by a thermal crystallization process at 500 to 750° C., and laser crystallization is performed to improve the crystallinity. As a method for deposition, a method such as plasma CVD, sputtering, or LPCVD may be used. As a method for crystallization, a method such as laser crystallization, thermal crystallization, or thermal crystallization using another catalyst (such as Fe, Ru, Rh, Pd, Os, Ir, Pt, Cu, or Au) may be used, furthermore the above-mentioned methods may be used alternatively more than once.

For crystallization of a semiconductor film having an amorphous structure, a continuous-wave laser may be used. In order to obtain a large-grain crystal by crystallization, it is preferable to use a continuous-wave solid laser and apply any of the second to fourth harmonics of the fundamental wave (the crystallization in this case is referred to as "CWLC"). Typically, the second harmonic (532 nm) or third harmonic (355 nm) of an Nd:$YVO_4$ laser (fundamental wave: 1064 nm) may be used. In the case of using a continuous-wave laser, laser light emitted from continuous-wave $YVO_4$ laser with 10 W output is converted into a harmonic by a non-linear optical element. There is also a method in which one of an $YVO_4$ crystal or a $GdVO_4$ crystal and a non-linear optical element are put in a resonator to emit a harmonic. Then, rectangular-shaped or elliptic-shaped laser light is preferably formed on a surface to be irradiated by an optical system to irradiate an object to be processed. In this case, a power density of approximately 0.01 to 100 MW/$cm^2$ (preferably, 0.1 to 10 MW/$cm^2$) is necessary. The semiconductor film may be moved to be irradiated at a speed of approximately 10 to 2000 cm/s relatively with respect to the laser light.

In the case of using a pulsed laser, a frequency band of several tens to several hundreds Hz is generally used. However, a pulsed laser with a repetition frequency of 10 MHz or more, which is much higher than the frequency band, may be used. Since the period from laser irradiation to a semiconductor film by a pulsed laser to perfect solidification of the semiconductor film is said to be several tens to several hundreds nsec, the use of the above-mentioned high frequency band allows to emit the next pulsed laser light during the period from melting of a semiconductor film by laser light to solidification thereof. Accordingly, a solid-liquid interface can be continuously moved in a semiconductor film unlike a case of using a conventional pulsed laser, so that a semiconductor film that has crystal grains grown continuously along the scanning direction is formed. Specifically, an assembly of crystal grains having a width of about 10 to 30 μm in the scanning direction and a width of about 1 to 5 μm in a direction perpendicular to the scanning direction can be formed. The formation of single-crystal grains long extended along the scanning direction makes it possible to form a semiconductor film in which there are almost no crystal grain boundaries in at least a channel direction of a TFT.

In the case of using siloxane that is a heat-resistant resin for a portion of the protective film 42, heat can be prevented from leaking from the semiconductor film during the crystallization described above, so that the crystallization can be performed efficiently.

According to the method described above, the crystalline silicon semiconductor film is obtained, where it is preferable that crystals are oriented in a source-channel-drain direction and the thicknesses of the crystal layers are made to be 20 to 200 nm (typically, 40 to 170 nm, more preferably, 50 to 150 nm). After that, an amorphous silicon film for gettering of the metal catalyst is formed over the semiconductor film with an oxide film interposed therebetween, and a gettering is performed by a heat treatment at 500 to 750° C. Further, in order to control a threshold voltage of a TFT element, boron ions of the dose amount on the order of $10^{13}$/$cm^2$ are added into the crystalline silicon semiconductor film. After that, the island-like semiconductor films 43 are formed by etching with a resist as a mask.

When a crystalline semiconductor film is formed, disilane ($Si_2H_6$) and germanium tetrafluoride ($GeF_4$) may be used as a material gas to form a polycrystalline semiconductor film directly by a LPCVD method (low pressure CVD), so that the crystalline semiconductor film can be obtained. In this case, the gas flow rate may be $Si_2H_6$/$GeF_4$=20/0.9, the deposition temperature may be 400 to 500° C., and He or Ar may be used as a carrier gas. However, the conditions are not limited to these.

It is preferable that a channel region in the TFT is particularly doped with hydrogen or halogen of $1 \times 10^{19}$ to $1 \times 10^{22}$ $cm^3$, preferably $1 \times 10^{19}$ to $5 \times 10^{20}$ $cm^{-3}$, or $1 \times 10^{19}$ to $2 \times 10^{21}$ cm$^{-3}$ in the case of SAS. In any case, the amount of hydrogen or halogen included in the channel region in the TFT may be more than that included in a single crystal to be used for an IC chip. This makes it possible, even when local cracks are generated in a TFT portion, to terminate the local cracks with hydrogen or halogen.

In the case of using a SAS (semiamorphous semiconductor) or the like, a crystallization process of the semiconductor film (a high-temperature heat treatment process) can be omitted. In this case, a chip can be formed directly on a flexible substrate. According to the present invention, a silicon wafer is not used in principle; however, a silicon wafer may be used as a separation substrate before transferring onto a flexible substrate or the like.

Next, a gate insulating film 44 is formed over the island-like semiconductor films 43 (FIG. 7B). It is preferable that a method for forming a thin film such as plasma CVD or sputtering is used to form a single layer or laminated layers of a layer including silicon nitride, silicon oxide, silicon nitride oxide, or silicon oxynitride as the gate insulating film. In the case of the laminated layers, for example, a three-layered structure of a silicon oxide film, a silicon nitride film, and a silicon oxide film, from the substrate side, may be preferably employed.

Next, a gate electrode 46 is formed (FIG. 7C). In this embodiment, after laminating and forming Si and W (tungsten) by sputtering, etching is conducted by using a resist 45 as a mask to form the gate electrode 46. Of course, the material, structure, or manufacturing method of the gate electrodes 46 is not limited to this, which can be appropriately selected. For example, a laminated structure of an n-type impurity doped or non-doped Si and NiSi (nickel silicide) or a laminated structure of TaN (tantalum nitride) and W may be employed. Alternatively, various conductive materials may be used to form the gate electrode 46 as a single layer.

Instead of the resist mask, a mask such as SiOx may be used. In this case, a process of forming a mask such as SiOx or SiON (which is called a hard mask) by patterning is added. However, since the mask is less reduced during etching than the resist, a gate electrode layer with a desired width can be formed. Alternatively, without using the resist 45, a droplet discharging method may be used to form the gate electrode 46 selectively.

As conductive materials, various materials can be selected depending on the function of a conductive film. In the case of forming the gate electrode and an antenna at the same time, materials may be selected in consideration of their functions.

As an etching gas in the case of forming the gate electrode by etching, a mixed gas in which $CF_4$, $Cl_2$ and $O_2$ are mixed or a $Cl_2$ gas is used. However, the etching gas is not limited to these gases.

Next, portions to become p-channel TFTs 54 and 56 are covered by a resist 47, and the island-like semiconductor films to become n-channel TFTs 53 and 55 are doped with an impurity element 48 (typically, P (phosphorus) or As (arsenic)) imparting n-type conductivity to form a low concentration impurity region with the gate electrode as a mask (a first doping process shown in FIG. 7D). The conditions of the first doping process are as follows: dose amount is $1\times10^{13}$ to $6\times10^{13}$/cm$^2$ and accelerating voltage is 50 to 70 keV. However, the conditions are not limited to these. By this first doping process, doping through the gate insulating film 44 is conducted to form a pair of low concentration impurity regions 49. The first doping process may be conducted to the whole area without covering the p-channel TFT regions with the resist.

Next, after removing the resist 47 by a method such as ashing, a new resist 50 is formed to cover an n-channel TFT region, and the island-like semiconductor films to become the p-channel TFTs 54 and 56 are doped with an impurity element 51 (typically, B (boron)) imparting p-type conductivity to form a high concentration impurity region with the gate electrode as a mask (a second doping process shown in FIG. 7E). The second doping process is performed under conditions as follows: dose amount is $1\times10^{16}$ to $3\times10^{16}$/cm$^2$ and accelerating voltage is 20 to 40 keV. By this second doping process, doping through the gate insulating film 44 is conducted to form a pair of high concentration p-type impurity regions 52.

Next, after removing the resist 50 by a method such as ashing, an insulating film 59 is formed over the substrate (FIG. 8F). In this embodiment, a $SiO_2$ film with a film thickness of 100 nm is formed by a plasma CVD method. Thereafter, the insulating film 59 and the gate insulating film 44 are etched and removed to form sidewalls 60 in a self alignment manner (FIG. 8G). As the etching gas, a $CHF_3$—He mixed gas is used.

The method for forming the sidewalls 60 is not limited to the method described above. For example, after forming the insulating film 59, the whole surface of the substrate may be covered by a resist and the resist, the insulating film 59 and the gate insulating film 44 may be etched and removed by an etchback method to form a sidewall 60 in a self alignment manner. Further, if the insulating film 59 is formed on the opposite sides of the substrate due to the property of the film forming method, a back-side treatment is conducted using the resist as a mask to remove the insulating film formed on the backside of the substrate, and then an etchback treatment may be conducted.

The insulating film 59 may have a laminated layer structure of two or more layers. For example, a two-layered structure of a SiON (silicon oxynitride) film with a film thickness of 100 nm and an LTO film (Low Temperature Oxide Film) with a film thickness of 200 nm is employed, where the SiON film is formed by a plasma CVD method and a $SiO_2$ film is formed by a low pressure CVD method as the LTO film. The shape of the sidewall 60 is not limited to that shown in at least FIG. 8G. The sidewall may have an L-shape or a combined shape of an L-shape and a circular shape.

The above-described sidewall functions as a mask for forming a low concentration impurity region or a non-doped offset region below the sidewall 60 when doping of a high concentration n-type impurity element is performed later. In any of the above-described methods for forming the sidewalls, the condition for etchback and the thickness of the insulating film 59 may be appropriately changed depending on the desired width of a low concentration impurity region or offset region.

Next, a new resist 61 is formed to cover the p-channel TFT regions, and with the gate electrode 46 and the sidewall 60 as masks, doping of an impurity element 62 imparting n-type conductivity (typically, P or As) is performed to form a high concentration impurity region (a third doping process shown in FIG. 8H). The third doping process is performed under conditions as follows: dose amount is $1\times10^{13}$ to $5\times10^{15}$/cm$^2$ and accelerating voltage is 60 to 100 keV. By this third doping process, doping through the gate insulating film 44 is conducted to form a pair of high concentration n-type impurity regions 63.

After removing the resist 61 by a method such as ashing, the impurity regions may be thermally activated. For example, after forming a SiON film of 50 nm, a heat treatment may be performed at 550° C. for 4 hours in a nitrogen atmosphere. In addition, after forming a SiNx film including hydrogen to have a film thickness of 100 nm, defects of the crystalline semiconductor film can be repaired by a heat treatment at 410° C. for 1 hour in a nitrogen atmosphere. This is a process, for example, for terminating dangling bonds existing in crystalline silicon, and is referred to as a hydrogenation treatment process. Further, after that, a SiON film with a film thickness of 600 nm may be formed as a cap insulating film protecting the TFTs. The hydrogenation treatment process may be performed after forming the SiON film. In this case, the SiON film can be formed continuously on SiNx film. In this way, the three-layered insulating films of SiON, SiNx, SiON are formed over the TFTs. However, the structures or materials of the insulating films are not limited to these. These insulating films, which also have a function of protecting the TFTs, are preferably formed.

Next, an interlayer film 64 is formed over the TFTs (FIG. 8I). Organic resin having heat-resistance such as polyimide, acryl and polyimide, and resin having heat-resistance such as siloxane and the like can be used for the interlayer film 64. In forming the interlayer film 64, a spin-coating method, a dipping method, a spray coating method, a droplet discharging method (such as an ink-jet method, a screen-printing method, an off-set printing method), a doctor knife, a roll coater, a curtain coater, a knife coater, and the like can be employed depending on the material of the interlayer film. Further, an inorganic material may be used. In that case, silicon oxide, silicon nitride, silicon oxynitride, PSG (phosphorus silicate glass), PBSG (phosphorus boron silicate glass), BPSG (borophosphosilicate glass), an alumina film and the like can be used. Note that these insulating films may be laminated to form the interlayer film 64.

Further, a protective film 65 may be formed over the interlayer film 64. As the protective film 65, a film containing carbon such as DLC (Diamond Like Carbon) or carbon nitride (CN), a silicon oxide film, a silicon nitride film, a silicon nitride oxide film, or the like can be employed. As for the forming method, plasma CVD, atmospheric plasma, or the like can be employed. Alternatively, a photosensitive or nonphotosensitive organic material such as polyimide, acrylic, polyamide, resist, and benzocyclobutene, or a heat-resistant resin such as siloxane resin may be employed.

Note that a filler may be mixed into the interlayer film 64 or the protective film 65 in order to prevent film detachment or a crack of these films due to stress generated by a difference of a thermal expansion coefficient between the interlayer film 64 or the protective film 65 and a conductive material or the like of a wiring to be formed at a subsequent step.

A contact hole is formed by etching after a resist is formed. A wiring 66 for connecting TFTs and a connection wiring 67 to be connected to an antenna are formed (FIG. 8I). As for an etching gas to be used for forming the contact hole, a $CHF_3$—He mixed gas is employed, but the present invention is not limited to this.

Here, the wiring 66 has a five-layer structure in which Ti, TiN, Al—Si, Ti and TiN are stacked from the substrate side. The wiring is preferably formed by a sputtering method and patterned. By mixing Si into the Al layer, the generation of hillocks can be prevented during resist baking when the wiring is patterned. Instead of the Si, Cu of about 0.5% may be mixed. In addition, by sandwiching the Al—Si layer with Ti or TiN, hillock resistance can be further improved. At the patterning, the above-described hard mask of SiON or the like is preferably employed. Note that the material and the forming method of these wirings are not limited to these, and the aforementioned material for forming the gate electrode may be employed.

The materials of the wiring 66 and the connection wiring 67 may be identical or different. As a forming method thereof, pattering may be performed with the use of a resist mask after forming a film over a whole surface of the substrate by sputtering, or a droplet discharging method may be used for forming the wiring selectively with a nozzle. Note that a droplet discharging method includes screen printing, offset printing as well as ink-jet. The wiring and the antenna may be formed at the same time, or one may be formed on the other which has been formed in advance.

In this embodiment, a TFT region having the CPU 57, the memory 58 and the like, and the antenna connection portion 68 are formed separately; however, the present invention can be applied when the TFT region and the antenna are integrated.

Through the processes described above, a thin film integrated circuit portion including TFTs is completed. Although a top-gate structure is employed in this embodiment, a bottom-gate structure (inversely staggered structure) may be employed. The materials of the base insulating film, the interlayer insulating film, and the wiring are mainly provided in a region where there is no thin film active element portion (active element) such as a TFT, where it is preferable that the region occupies 50% or more of the whole of the thin film integrated circuit portion, preferably 70 to 95% thereof. This makes it easier to bend and treat the ID tag 2 that is a completed article. In this case, it is preferable that the island-like semiconductor region (island) of active elements including the TFT portions occupies 1 to 30% of the whole of the thin film integrated circuit portion, preferably 5 to 15% thereof.

In addition, as shown in FIG. 8I, it is preferable to control the thickness of the upper and lower protective film and the interlayer film so that the distance ($t_{under}$) from the semiconductor layer of the TFT to the lower protective film and the distance ($t_{over}$) from the semiconductor layer to the upper interlayer film (a protective film in the case where the protective film is formed) are equal or substantially equal to each other in the thin film integrated circuit portion. By locating the semiconductor layer in the center of the thin film integrated circuit portion in this way, stress to the semiconductor layer can be eased, and cracks can be prevented from being generated.

The TFTs manufactured according to this embodiment have a S value (subthreshold value) of 0.35 V/dec or less (preferably, 0.07 to 0.25 V/dec) and a mobility of 10 $cm^2$/Vsec or more, and further have a characteristic of 1 MHz or more, preferably 10 MHz or more on the level of ring oscillator (at 3 to 5 V) or have a frequency characteristic per gate of 100 kHz or more, preferably 1 MHz or more (at 3 to 5 V).

After a plurality of thin film integrated circuit portions are formed over the substrate 40 (FIG. 9J), a groove 70 is formed by dicing and the plurality of thin film integrated circuit portions are isolated for each ID tag to obtain thin film integrated circuit portions 69 (FIG. 9K). In this case, a blade dicing method using a dicing device (dicer) is commonly used. The blade is a grinding stone into which a diamond abrasive is implanted, which has a width of about 30 to 50 μm. By rapidly spinning this blade, the thin film integrated circuit portions are isolated for each ID tag. An area necessary for dicing is referred to as a street, which preferably has a width of 80 to 150 μm in consideration of damage to the elements.

In addition to dicing, a method such as scribing or etching with the use of a mask can be used. In the case of scribing, there are methods such as diamond scribing and laser scribing. In the case of employing laser scribing, linear laser light with power of 200 to 300 W emitted from a pulsed laser resonator, for example, a fundamental wave of 1064 nm in wavelength or the second harmonic of 532 nm in wavelength of an Nd:YAG laser, can be used.

In the case of etching, after forming a mask pattern according to processes of light-exposure and development, the elements can be separated from each other by dry etching. In dry etching, atmospheric plasma may be used. As a gas for dry etching, a chlorine-based gas typified by $Cl_2$, $BCl_3$, $SiCl_4$, $CCl_4$ or the like, a fluorine-based gas typified by $CF_4$, $SF_6$, $NF_3$, $CHF_3$ or the like, and $O_2$ is used. However, the gas for dry-etching is not limited to these. The etching can also be performed by using atmospheric plasma. In this case, a $CF_4$—$O_2$ mixed gas is preferably used as the etching gas. The groove 70 may be formed by etching more than once with the use of different kinds of gasses. Of course, the groove 70 may be formed by wet etching.

When the groove 70 is formed, the groove may have a depth to the point that at least a surface of the separation layer is exposed, and it is preferable that the method such as dicing is appropriately controlled in order not to scratch the substrate so that the substrate 40 can be used repeatedly.

Next, a jig 72 (supporting substrate) with protrusions 71 is attached to each of the thin film integrated circuits portions 69 with an adhesive agent 73 interposed therebetween (FIG. 9L). The jig has a function of temporarily fixing the plurality of thin film integrated circuit portions in order to prevent the thin film integrated circuit portions from separating discretely after removing the separation layer. It is preferable that the jig has a structure that has protrusions 71 and that is a comb-like, as shown in FIG. 9L, in order to make it easier to introduce a gas or liquid including halogen fluoride later. However, a flat jig may be used. More preferably, an opening portion 74 may be provided in order to make it easier to introduce a gas or liquid including halogen fluoride later.

As the jig 72, for example, a glass substrate, quartz substrate including silicon oxide as its main component, and stainless (SUS) substrate, which are not damaged by halogen fluoride, can be used. As long as a material that is not damaged by halogen fluoride is used, the jig is not limited to these substrates.

As the adhesive agent 73, typically, a material whose adhesive force (adhesion) is reduced or lost by UV-light irradiation can be used. An UV-irradiation separating tape manufactured by Nitto Denko is used here. In addition to this, an adhesive agent that can be attached and detached repeatedly may be used, which is used for products such as "Post-it" (registered trademark) manufactured by THREE M INNOVATIVE PROPERTIES and "NOTESTIX" (registered trademark) manufactured by MOORE BUSINESS FORMS INC. For example, an acrylic adhesive, a synthetic rubber adhesive, and a natural rubber adhesive, described in Japanese Patent Application Laid-Open No. 2001-30403, Japanese Patent No. 2992092, and Japanese Patent Application Laid-Open No. H6-299127, can be used. Of course, as long as a material to be used can easily remove the jig, the adhesive agent is not limited to these materials. An adhesive agent that can be separated without UV-light irradiation or the like may be employed.

Figure 12:
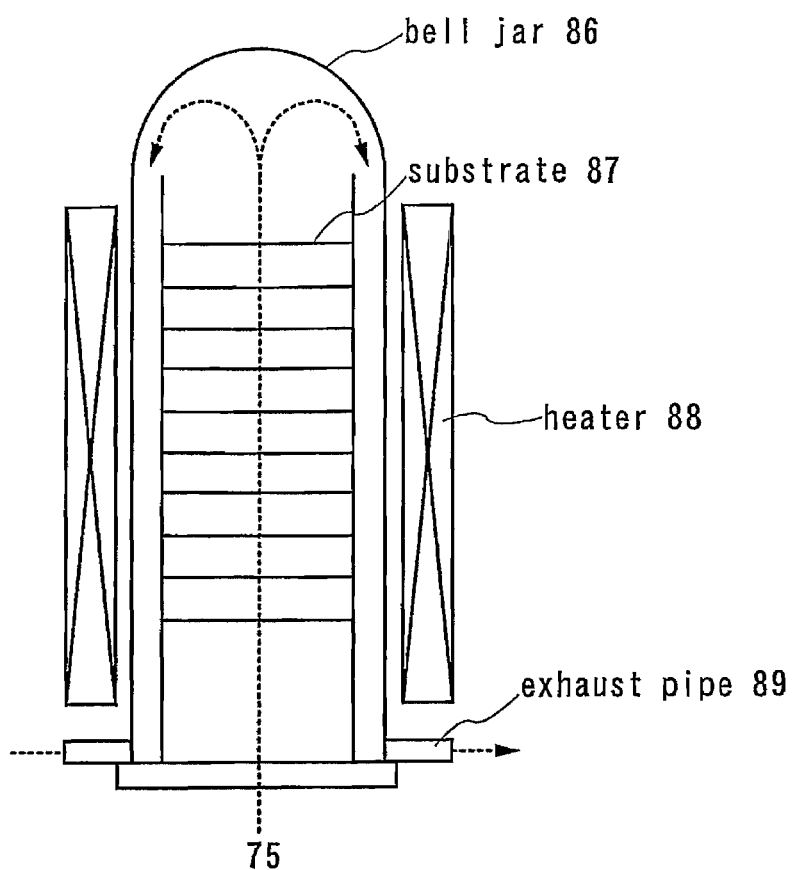
FIG. 12 is a schematic view of a low pressure CVD apparatus used for forming an ID tag according to one aspect of the present invention.

Next, an a-Si film that is the separation layer is etched and removed by introducing a halogen fluoride gas 75 into the groove 70 (FIG. 10M). A low pressure CVD system shown in FIG. 12 is used here to etch and remove the a-Si film under conditions of gas: $ClF_3$ (chlorine trifluoride), temperature: 350° C., flow rate: 300 sccm, pressure: $8 \times 10^2$ Pa, and time: 3 hours. However, the conditions, which are not limited, may be appropriately changed. Alternatively, a gas of $ClF_3$ gas mixed with nitrogen may be used, where the flow rate of the both gases can be appropriately set. In addition to $ClF_3$, a gas such as $BrF_3$ or $ClF_2$ may also be used.

The low pressure CVD system shown in FIG. 12 has a mechanism that a halogen fluoride gas such as a $ClF_3$ gas 75 is introduced into a bell jar 86 that is a reaction field to circulate the gas to a substrate 87. In addition, a heater 88 is provided outside the bell jar, and a remaining gas is exhausted from an exhaust pipe 89.

While silicon is selectively etched by halogen fluoride such as $ClF_3$, silicon oxide (SiOx), silicon nitride (SiNx), or silicon oxynitride (SiOxNy or SiNxOy) is hardly etched. Accordingly, the separation layer 41 is etched with time, so that the substrate 40 can finally be separated (FIG. 10N). On the other hand, the protective film that is a base film, interlayer film, or protective film including a material such as silicon oxide, silicon nitride, silicon oxynitride, or a heat-resistant resin is hardly etched, damage to the thin film integrated circuits can be prevented. The substrate 40 that has been separated can be, of course, reused, which leads to more reduction in cost than the case of grinding a silicon wafer in a conventional manner.

Next, the adhesion of the adhesive agent 73 is reduced or lost by UV-light irradiation to separate the jig 72 from the thin film integrated circuit portions 69 (FIG. 10O). It is preferable to reuse the jig 72 for reduction in cost.

The thin film integrated circuit portion 69 isolated for each ID tag by the above method is transported by small vacuum tweezers or the like. The thin film integrated circuit portions are coated as shown in FIGS. 11A and 11B to complete the ID tag 2, for example.

FIGS. 11A and 11B show a schematic diagram of a manufacturing line of an ID tag 2 and a magnified drawing of the ID tag as a completed article. Initially, as shown in FIG. 11A, a material that is to be an inlet substrate 81 (FIG. 11B) of the ID tag 2 is supplied from a substrate supplying means 76. The inlet substrate 81 may have a single layer structure or a laminated layer structure.

An antenna 82 is formed in the inlet substrate 81 in advance. As a conductive material of the antenna 82, Ag, Au, Al, Cu, Zn, Sn, Ni, Cr, Fe, Co or Ti or an alloying including the elements can be used typically. Note that the antenna 82 is formed to include a material having sufficient malleability and ductility and more preferably, is formed to be thick so as to endure stress due to transformation. Note that the antenna 82 is formed and then may be covered by a protective film.

As a forming method of the antenna 82, patterning may be performed with the use of a resist mask after forming a film over a whole surface of the substrate by sputtering, or a droplet discharging method may be used for forming selectively with a nozzle. Note that a droplet discharging method includes screen printing, offset printing as well as ink-jet.

Then, the thin film integrated circuit portion 69 is attached (bonded) to a desired region of the inlet substrate 81 by an attaching means 77. At this time, an anisotropic conductive film (ACF), an ultrasonic bonding method, a UV bonding method and the like are employed appropriately as the bonding method. In the case where the thin film integrated circuit portion 69 is attached to the inlet substrate 81, the thin film integrated circuit portions 69 may be attached to the inlet substrates 81 that have been already isolated for each ID tag, or the material of the inlet substrate 81 in which the thin film integrated circuit portions 69 have been already provided may be isolated for each ID tag. Note that the material of the inlet substrate 81 may be roll-like, plate-like or the like. By employing a laminating device 79, the periphery of each inlet substrate 81 is covered in a laminating process. The periphery of the thin film integrated circuit portion 69 may be covered in advance by a filling layer 83 containing filler 84. In addition, a laminate resin layer 85 may be filled with filler.

In this manner, the ID tag 2 is completed. After forming the thin film integrated circuit portion 69 in a desired position of the band-like substrate and performing a laminating process, the substrate may be isolated for each ID tag. The ID tag 2 that has been subjected to the laminate processing is collected by a collecting means 80.

Note that a coating means of the thin film integrated circuit portion 69 is not limited to a laminating method. In addition, a material for coating can employ various materials such as a paper or a resin appropriately. For example, a flexible resin material such as plastic having flexibility is used and thus the ID tag 2 can be treated easily.

FIG. 11B is a cross sectional and magnified view of the ID tag 2 manufactured in this embodiment. The antenna 82 and the thin film integrated circuit portion 69 connected to the antenna 82 are formed on the inlet substrate 81, and the inlet substrate 81 is covered by the laminate resin layer 85 with the filling layer 83 containing the filler 84. The antenna 82 may be directly connected to the thin film integrated circuit portion 69 or a connection pad portion including a conductive material may be formed between the antenna 82 and the thin film integrated circuit portion 69.

In order to protect the thin film integrated circuit portion 69 and the antenna 82 in a heat treatment or the like during the laminating process, it is preferable to use a heat-resistant resin such as siloxane for the filling layer 83. In addition, a protective film may be formed separately. As the protective film, a film including carbon such as DLC or carbon nitride (CN), a silicon nitride film, a silicon nitride oxide film or the like can be used. However, the protective film is not limited to these. As a forming method thereof, a method such as plasma CVD or atmospheric plasma can be used.

In this embodiment, as a method for separating the substrate, a method may be employed, in which stress is given to the substrate provided with a plurality of thin film integrated circuit portions to separate the substrate physically. In this case, materials such as W, $SiO_2$, and $WO_3$ can be used as the separation layer. In order to give stress, shock may be applied with a diamond pen or the like.

The manufacturing method of the ID tag 2 is described above. As for the resonant circuit portions 4 and 39, the integrated circuit portions thereof are formed by using thin films and isolated by the separation method.

Note that this embodiment can be combined freely with the other embodiment modes and embodiments.

Embodiment 6

Embodiment 6 describes, with reference to FIGS. 13A to 13C, an example in which the thin film integrated circuit portion 69 is directly transferred and attached onto the inlet substrate 81 of the ID tag, without removing a jig 72 attached onto the thin film integrated circuit portion 69 after separating the thin film integrated circuit portion by a halogen fluoride gas in Embodiment 5.

First, as shown in Embodiment 5, a plurality of thin film integrated circuit portions. 69 are formed and a jig 72 is attached by an adhesive agent 73. As shown in FIG. 13A, a material having a protrusion 71 is employed as the jig 72. As the adhesive agent 73, a material whose adhesion is reduced or lost by UV-light irradiation is used here. In addition, a protective film 90 made of an organic material or an inorganic material is provided to prevent the thin film integrated circuit portions 69 from being damaged. Etching is conducted by halogen fluoride such as $ClF_3$ to isolate elements.

Next, the jig 72 attached with the plurality of thin film integrated circuit portions 69 are transferred and aligned with a stage 91 in which the inlet substrates 81 of ID tags are arranged. At this time, as shown in FIG. 13A, an alignment marker 93 provided for the jig 72 and the stage 91 can be used. An adhesive agent 92 has been formed in advance in a portion of the inlet substrate 81 for forming the thin film integrated circuit portion 69, and by controlling the position of the jig 72, a desired element is attached to a desired portion of a product (FIG. 13A). Simultaneously, the thin film integrated circuit portion 69 is electrically connected to the antenna 82 formed on the inlet substrate 81.

Next, the thin film integrated circuit portion 69 to be attached onto the inlet substrate 81 is selectively irradiated with UV light 94 to reduce or cause a loss of adhesion of the adhesive agent 73, thereby separating the jig 72 from the thin film integrated circuit portion (FIG. 13B). Thus, a desired thin film integrated circuit portion 69 can be formed in a desired portion of the inlet substrate 81. Further, the thin film integrated circuit portion 69 is covered by coating 95 (FIG. 13C). Note that here the antenna 82 is formed inside the inlet substrate 81; however, an antenna may be formed in advance in the thin film integrated circuit portion 69.

According to the present invention shown in this embodiment, a desired thin film integrated circuit portion 69 can be formed in a desired portion, without separating elements discretely, in separating the elements by etching using halogen fluoride such as $ClF_3$. Note that this embodiment can be freely combined with the other embodiment modes and embodiments.

As described above, the present invention is effective for packing products by a package body, storing, distributing and so on. According to the present invention, the convenience of an ID tag can be improved remarkably. In addition, in Embodiment modes and Embodiments described above, an object to be attached with an ID tag is a product; however, is not limited to products, and the object to be attached with an ID tag may also be an object to be managed, such as animals and plants. Therefore, the present invention can be applied widely, and availability thereof is so large.

EXPLANATION OF REFERENCE

1. product, 2. ID tag, 3. package body, 4. resonance circuit portion, 5. R/W, 6. antenna portion, 7. display portion, 8. operation key, 9. computer, 10. database, 11. controller, 12. output interface, 13. input interface, 14. output antenna, 15. input antenna, 16. integrated circuit portion, 17. electromagnetic wave, 18. antenna coil, 19. capacitor, 20. input antenna, 21. output antenna, 22. input interface, 23. output interface, 24. rectification circuit, 25. demodulation circuit, 26. modulation circuit, 27. amplifier, 28. bus, 29. thin film integrated circuit portion, 30. CPU, 31. coprocessor, 32. ROM, 33. RAM, 34. nonvolatile memory, 35. suitcase, 36. price tag, 37. conveyer, 38. transportation vehicle, 39. resonance circuit portion, 40. substrate, 41. separation layer, 42. protective film, 43. island-like semiconductor film, 44. gate insulating film, 45. resist, 46. gate electrode, 47. resist, 48. impurity element, 49. low concentration impurity region, 50. resist, 51. impurity element, 52. p-type high concentration impurity region, 53. n-channel TFT, 54. p-channel TFT, 55. n-channel TFT, 56. p-channel TFT, 57. CPU, 58. memory, 59. insulating film, 60. sidewall, 61. resist, 62. impurity element, 63. n-type high concentration impurity region, 64. interlayer film, 65. protective film, 66. wiring, 67. connection wiring, 68. antenna connection portion, 69. thin film integrated circuit portion, 70. groove, 71. protrusion, 72. jig, 73. adhesive agent, 74.

opening portion, 75. halogen fluoride gas, 76. substrate supplying means, 77. attaching means, 78. substrate isolating means, 79. laminating device, 80. collecting means, 81. inlet substrate, 82. antenna, 83. filling layer, 84. filler, 85. laminate resin layer, 86. bell jar, 87. substrate, 88. heater, 89. exhaust pipe, 90. protective film, 91. stage, 92. adhesive agent, 93. marker, 94. UV light, 95. coating, 201. antenna wiring, 202. antenna capacitor, 203. first capacitor means, 204. first diode, 205. second diode, 206. second capacitor means, 207. third diode, 208. third capacitor means, 209. switching element, 210. logic circuit, 211. amplifier, 212. clock generation circuit-decoder, 213. memory, 214. power supply circuit, 215. input-output circuit, 216. antenna circuit,

What is claimed is:

1. A system comprising:
a resonance circuit; and
means for outputting a signal,
wherein the resonance circuit comprises an antenna coil and a first capacitor,
wherein the resonance circuit is configured to receive a first signal from the means for outputting a signal, and configured to output a second signal in response to receipt of the first signal,
wherein the resonance circuit is attached to a packing material,
wherein a semiconductor device is configured to receive the second signal from the resonance circuit,
wherein a rectification circuit included in the semiconductor device generates a direct-current source voltage based on the second signal,
wherein the semiconductor device is provided inside of a product,
wherein the product is contained in the packing material, and
wherein the means for outputting a signal is disposed outside of the packing material.

2. The system according to claim 1, wherein a communication method between the means for outputting a signal and the resonance circuit, and a communication method between the resonance circuit and the semiconductor device are identical to each other.

3. The system according to claim 2, wherein the communication method is an electromagnetic induction method.

4. The system according to claim 1, wherein a communication method between the means for outputting a signal and the resonance circuit is different from a communication method between the resonance circuit and the semiconductor device.

5. The system according to claim 1, wherein a communication method between the means for outputting a signal and the resonance circuit is any one of an electromagnetic induction method and a microwave method.

6. The system according to claim 1, wherein the semiconductor device is selected from the group of an ID tag, an ID chip, an ID label, an ID seal and an ID sticker.

7. The system according to claim 1, wherein the resonance circuit further comprises any one of a battery, a CPU and a memory.

8. The system according to claim 1,
wherein the rectification circuit comprises a thin film active element.

9. The system according to claim 1,
wherein the semiconductor device comprises a demodulation circuit and a modulation circuit.

10. A system comprising:
a first resonance circuit;
a second resonance circuit; and
means for outputting a signal,
wherein the first resonance circuit comprises a first antenna coil and a first capacitor,
wherein the first resonance circuit is attached to a first packing material,
wherein the second resonance circuit comprises a second antenna coil and a second capacitor,
wherein the second resonance circuit is attached to a second packing material,
wherein the second resonance circuit is configured to receive a first signal from the means for outputting a signal, and configured to output a second signal in response to receipt of the first signal,
wherein the first resonance circuit is configured to receive the second signal from the second resonance circuit, and configured to output a third signal in response to receipt of the second signal,
wherein a semiconductor device is configured to receive the third signal from the first resonance circuit,
wherein a rectification circuit included in the semiconductor device generates a direct-current source voltage based on the third signal, for driving the semiconductor device,
wherein the semiconductor device is contained in the first packing material,
wherein the first packing material is contained in the second packing material, and
wherein the means for outputting a signal is disposed outside of the second packing material.

11. The system according to claim 10, wherein a communication method between the means for outputting a signal and the first resonance circuit, a communication method between the first resonance circuit and the second resonance circuit, and a communication method between the second resonance circuit and the semiconductor device are identical to each other.

12. The system according to claim 11, wherein the communication method is an electromagnetic induction method.

13. The system according to claim 10, wherein a communication method between the means for outputting a signal and the second resonance circuit is different from a communication method between the first resonance circuit and the semiconductor device.

14. The system according to claim 10, wherein a communication method between the means for outputting a signal and the second resonance circuit is any one of an electromagnetic induction method and a microwave method.

15. The system according to claim 10, wherein the semiconductor device is selected from the group of an ID tag, an ID chip, an ID label, an ID seal and an ID sticker.

16. The system according to claim 10, wherein at least one of the first resonance circuit and the second resonance circuit further comprises any one of a battery, a CPU and a memory.

17. The system according to claim 10,
wherein the rectification circuit comprises a thin film active element.

18. The system according to claim 10,
wherein the semiconductor device comprises a demodulation circuit and a modulation circuit.

19. A method comprising:
sending a first signal from means for outputting a signal to a first resonance circuit, wherein the first resonance circuit comprises a first antenna coil and a first capacitor;
sending a second signal from the first resonance circuit to a second resonance circuit in response to receipt of the first signal, wherein the second resonance circuit comprises a second antenna coil and a second capacitor;

sending a third signal from the second resonance circuit to a semiconductor device in response to receipt of the second signal, wherein the semiconductor device comprises a rectification circuit, and an antenna; and generating a direct-current source voltage in the rectification circuit based on the third signal, for driving the semiconductor device, wherein the first resonance circuit is attached to a first packing material, wherein the second resonance circuit is attached to a second packing material, wherein the second packing material is contained in the first packing material, wherein the semiconductor device is contained in the second packing material, and wherein the means for outputting a signal is disposed outside of the first packing material.

20. The method according to claim 19, wherein the semiconductor device is selected from the group of an ID tag, an ID chip, an ID label, an ID seal and an ID sticker.

21. The method according to claim 19, wherein at least one of the first resonance circuit and the second resonance circuit further comprises any one of a battery, a CPU and a memory.

22. The method according to claim 19,
wherein the rectification circuit comprises a thin film active element.

23. The method according to claim 19,
wherein the semiconductor device comprises a demodulation circuit and a modulation circuit.

* * * * *